United States Patent
Sakoh et al.

(10) Patent No.: US 9,809,679 B2
(45) Date of Patent: Nov. 7, 2017

(54) FLUOROPOLYETHER-CONTAINING POLYMER-MODIFIED SILANE

(71) Applicant: Shin-Etsu Chemical Co., Ltd., Tokyo (JP)

(72) Inventors: Ryusuke Sakoh, Annaka (JP); Takashi Matsuda, Annaka (JP); Yuji Yamane, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/159,057

(22) Filed: May 19, 2016

(65) Prior Publication Data

US 2016/0355638 A1    Dec. 8, 2016

(30) Foreign Application Priority Data

Jun. 3, 2015  (JP) .................................. 2015-112822

(51) Int. Cl.
  *C07F 7/04* (2006.01)
  *C08G 65/336* (2006.01)
  *C08G 65/00* (2006.01)

(52) U.S. Cl.
  CPC .......... *C08G 65/336* (2013.01); *C08G 65/007* (2013.01)

(58) Field of Classification Search
  CPC .......................... C08G 65/336; C08G 2150/00
  USPC ........................................................... 556/440
  See application file for complete search history.

(56) References Cited

U.S. PATENT DOCUMENTS

| | | | |
|---|---|---|---|
| 8,211,544 B2 * | 7/2012 | Itami | ................ C07F 7/1836 428/429 |
| 8,664,421 B2 | 3/2014 | Itami et al. | |
| 8,900,711 B2 | 12/2014 | Yamane et al. | |
| 2013/0136928 A1 | 5/2013 | Yamane et al. | |
| 2013/0303689 A1 | 11/2013 | Sato et al. | |

FOREIGN PATENT DOCUMENTS

| | | |
|---|---|---|
| JP | 2008-534696 | 8/2008 |
| JP | 2008-537557 | 9/2008 |
| JP | 2012-72272 | 4/2012 |
| JP | 2012-157856 | 8/2012 |
| JP | 2013-136833 | 7/2013 |

* cited by examiner

*Primary Examiner* — Fereydoun G Sajjadi
*Assistant Examiner* — Kofi Adzamli
(74) *Attorney, Agent, or Firm* — Oblon, McClelland, Maier & Neustadt, L.L.P.

(57) ABSTRACT

A fluoropolyether-containing polymer-modified silane having a hydroxyl group protected with a carbonyl, sulfonyl or phosphoryl group may be synthesized without forming by-products.

10 Claims, No Drawings

FLUOROPOLYETHER-CONTAINING POLYMER-MODIFIED SILANE

CROSS-REFERENCE TO RELATED APPLICATION

This non-provisional application claims priority under 35 U.S.C. §119(a) on Patent Application No. 2015-112822 filed in Japan on Jun. 3, 2015, the entire contents of which are hereby incorporated by reference.

TECHNICAL FIELD

This invention relates to a silane modified with a fluoropolyether-containing polymer.

BACKGROUND ART

Recently, there is an accelerating demand to mount touch panels as the screen on mobile phones and other displays. While the touch panel has a screen kept bare, there are many chances of the finger or cheek coming in direct contact with the screen. Undesirably the touch panel is readily fouled with stains like sebum. There is an increasing need for technology to attain fingerprint proofness or easy stain removal on a display surface for better appearance or visibility. It is thus desired to have a material capable of meeting these requirements. Prior art water/oil repellent layers have high water/oil repellency and easy stain wipe-off, but suffer from the problem that the antifouling performance deteriorates during service.

Generally, fluoropolyether-containing compounds exhibit, by virtue of their extremely low surface free energy, water/oil repellency, chemical resistance, lubricity, parting, antifouling and other properties. Taking advantage of these properties, they find use in a variety of industrial fields as water/oil repellent antifouling agents for paper and textiles, lubricants for magnetic recording media, oil-repellent agents for precision instruments, parting agents, cosmetic ingredients, protective films and the like. Inversely, the same properties indicate non-tackiness or non-adhesion to other substrates. Even if they can be coated to the substrate surface, it is difficult for the coating to tightly adhere thereto.

On the other hand, silane coupling agents are well known for their ability to bond surfaces of glass or fabric substrates to organic compounds. They are widely used as surface coating agents for numerous substrates. The silane coupling agent contains an organic functional group and a reactive silyl group (typically alkoxysilyl) in the molecule. In the presence of airborne moisture or the like, the alkoxysilyl groups undergo self-condensation reaction to form a coating. As the alkoxysilyl groups form chemical and physical bonds with the surface of glass or metal, the coating becomes a tough coating having durability.

Patent Documents 1 to 5 disclose a composition predominantly comprising a fluoropolyether-containing polymer-modified silane which is obtained by introducing a hydrolyzable silyl group into a fluoropolyether-containing compound, the composition being tightly adherent to the substrate surface and capable of forming a coating with water/oil repellency, chemical resistance, lubricity, parting, antifouling and other properties.

Lenses and antireflective coatings, when treated with the fluoropolyether-containing polymer-modified silane, are improved in lubricity and parting property, but lack abrasion resistance.

CITATION LIST

Patent Document 1: JP-A 2008-534696 (U.S. Pat. No. 8,211,544)
Patent Document 2: JP-A 2008-537557 (U.S. Pat. No. 8,664,421)
Patent Document 3: JP-A 2012-072272 (U.S. Pat. No. 8,900,711)
Patent Document 4: JP-A 2012-157856 (US 2013303689)
Patent Document 5: JP-A 2013-136833 (US 2013136928)

DISCLOSURE OF INVENTION

The inventors proposed in Japanese Patent Application No. 2014-250460 a fluoropolyether-containing polymer-modified silane of the following formula as a fluoropolyether-containing compound having excellent abrasion resistance.

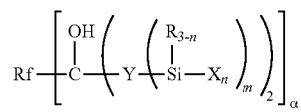

Herein Rf is a monovalent fluorooxyalkyl or divalent fluorooxyalkylene-containing polymer residue, Y is a divalent to hexavalent hydrocarbon group which may contain a siloxane bond or silylene group, R is independently $C_1$-$C_4$ alkyl or phenyl, X is independently a hydrolyzable group, n is an integer of 1 to 3, m is an integer of 1 to 5, and α is 1 or 2. A surface treating agent comprising the polymer-modified silane and/or partial hydrolytic condensate thereof forms a coating with excellent water/oil repellency and abrasion resistance. In the course of synthesis, however, side reactions may occur owing to the hydroxyl group in the polymer, forming by-products.

An object of the invention is to provide a fluoropolyether-containing polymer-modified silane which is free of by-products.

The inventors have found that in the course of synthesis of the fluoropolyether-containing polymer-modified silane mentioned above, no by-products are formed when the hydroxyl group is protected with a carbonyl, sulfonyl or phosphoryl group.

In one aspect, the invention provides a fluoropolyether-containing polymer-modified silane having the general formula (1).

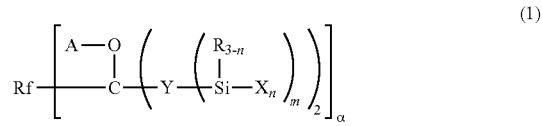

(1)

Herein Rf is a monovalent fluorooxyalkyl or divalent fluorooxyalkylene-containing polymer residue, A is a group having a structure selected from the following formulae:

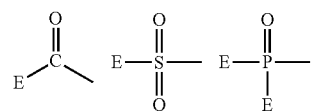

wherein E is a monovalent organic group, Y is a divalent to hexavalent hydrocarbon group which may contain a siloxane bond or silylene group, R is independently a $C_1$-$C_4$ alkyl group or phenyl group, X is independently a hydroxyl group or hydrolyzable group, n is an integer of 1 to 3, m is an integer of 1 to 5, and α is 1 or 2.

In a preferred embodiment, α is 1, and Rf is a group having the general formula (2).

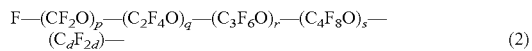

$$F-(CF_2O)_p-(C_2F_4O)_q-(C_3F_6O)_r-(C_4F_8O)_s-(C_dF_{2d})- \qquad (2)$$

Herein p, q, r and s are each independently an integer of 0 to 200, the sum p+q+r+s is 3 to 200, d is an integer of 1 to 3, each repeating unit may be linear or branched, and individual repeating units may be randomly arranged.

In another preferred embodiment, α is 2, and Rf is a group having the general formula (3).

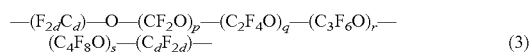

$$-(F_{2d}C_d)-O-(CF_2O)_p-(C_2F_4O)_q-(C_3F_6O)_r-(C_4F_8O)_s-(C_dF_{2d})- \qquad (3)$$

Herein p, q, r and a are each independently an integer of 0 to 200, the sum p+q+r+s is 3 to 200, d is an integer of 1 to 3, each repeating unit may be linear or branched, and individual repeating units may be randomly arranged.

In a preferred embodiment, Y is selected from among a $C_3$-$C_{10}$, alkylene group, an alkylene group containing $C_1$-$C_{10}$ arylene, a divalent group having alkylene groups bonded via a silalkylene or silarylene structure, and a divalent to tetravalent group having $C_2$-$C_{10}$ alkylene groups bonded to a divalent to tetravalent, linear organopolysiloxane residue of 2 to 10 silicon atoms or branched or cyclic organopolysiloxane residue of 3 to 10 silicon atoms.

In a preferred embodiment, X is selected from among hydroxyl, $C_1$-$C_{10}$ alkoxy group, $C_2$-$C_{10}$ alkoxyalkoxy group, $C_1$-$C_{10}$ acyloxy group, $C_2$-$C_{10}$, alkenyloxy group, and halogen.

In a preferred embodiment, E is a substituted or unsubstituted monovalent hydrocarbon group of 1 to 10 carbon atoms, alkoxy group of 1 to 6 carbon atoms or phenoxy group.

In a preferred embodiment, the fluoropolyether-containing polymer-modified silane having formula (1) is selected from compounds having the following formulae.

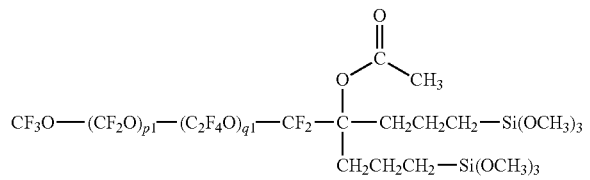

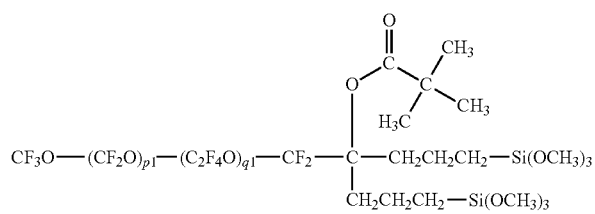

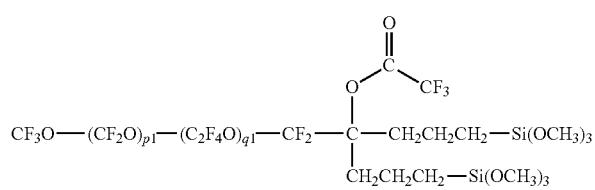

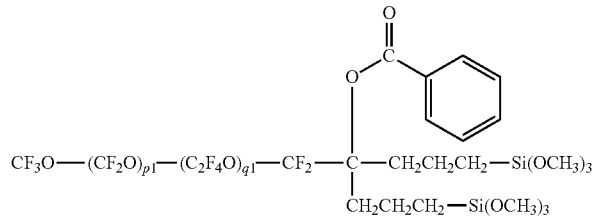

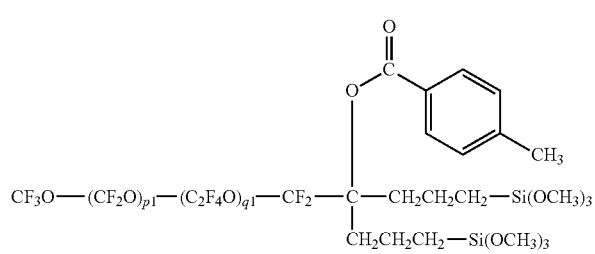

-continued

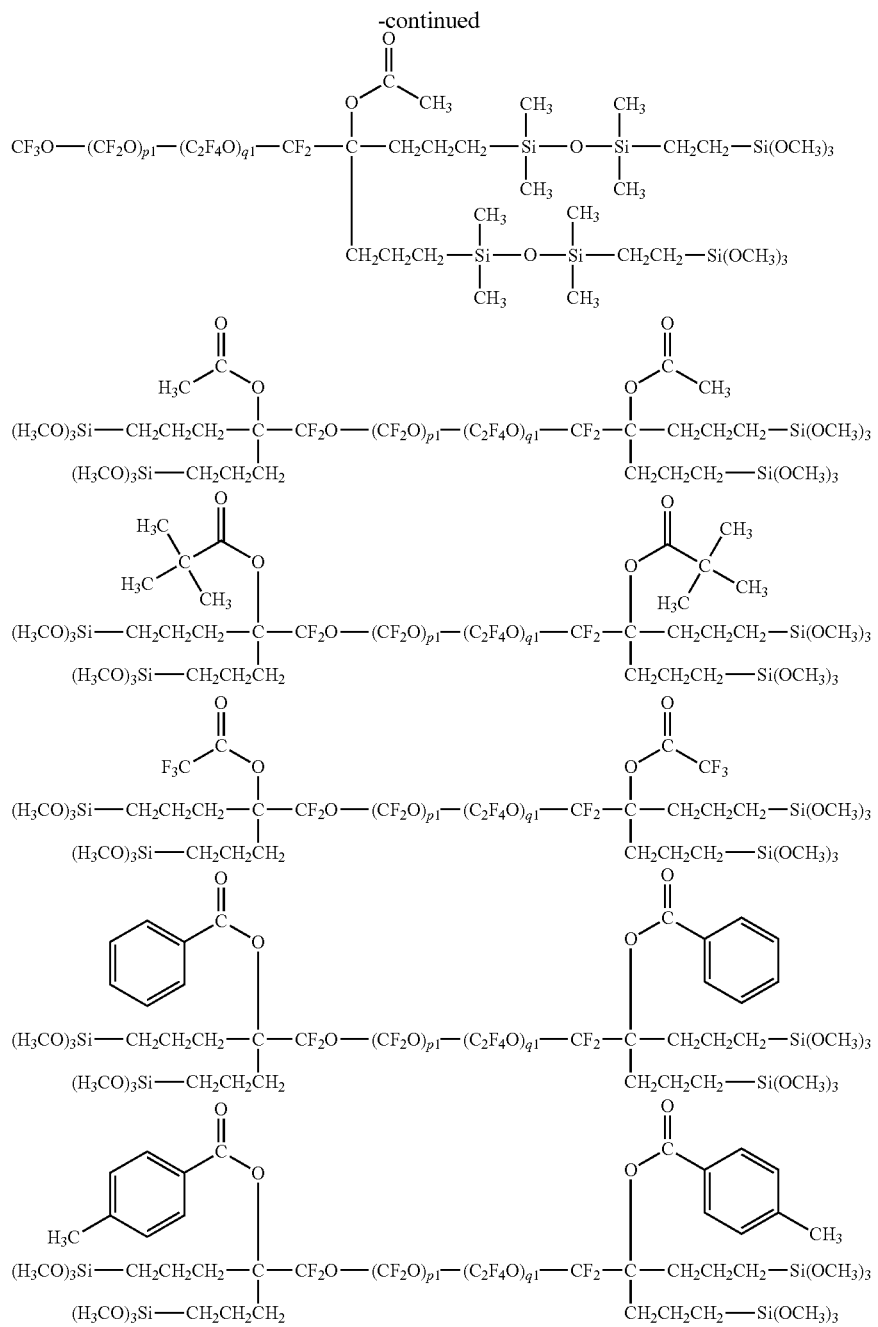

Herein p1 is an integer of 5 to 100, q1 is an integer of 5 to 100, and the sum p1+q1 is an integer of 10 to 105.

Advantageous Effects of Invention

The fluoropolyether-containing polymer-modified silane forms a coating having water/oil repellency. In the course of its synthesis, formation of by-products is suppressed.

DESCRIPTION OF PREFERRED EMBODIMENTS

The singular forms "a," "an" and "the" include plural referents unless the context clearly dictates otherwise. The notation (Cn-Cm) means a group containing from n to m carbon atoms per group.

The fluoropolyether-containing polymer-modified silane of the invention has the general formula (1).

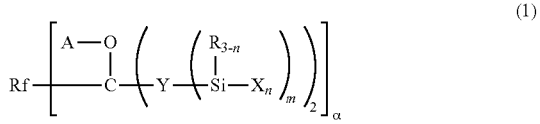

Herein Rf is a monovalent fluorooxyalkyl or divalent fluorooxyalkylene-containing polymer residue, A is a group having a structure selected from the following formulae:

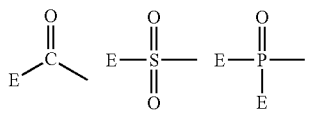

wherein E is a monovalent organic group, Y is a divalent to hexavalent hydrocarbon group which may contain a siloxane bond or silylene group, R is independently a $C_1$-$C_4$ alkyl group or phenyl group, X is independently a hydroxyl group or hydrolyzable group, n is an integer of 1 to 3, m is an integer of 1 to 5, and α is 1 or 2.

The fluoropolyether-containing polymer-modified silane of the invention has a structure that the monovalent fluorooxyalkyl or divalent fluorooxyalkylene-containing polymer residue (Rf) is linked to the hydrolysable silyl group such as alkoxysilyl or hydroxyl-containing silyl group (—Si$(R)_{3-n}(X)_n$) via the hydrocarbon chain (Y). Further, the carbon-bonded hydroxyl group in the polymer is protected with an acyl protective group such as carbonyl, sulfonyl or phosphoryl. This structure eliminates inclusion of by-products which would otherwise form during the polymer synthesis process.

In one preferred embodiment wherein α is 1, Rf is a monovalent fluorooxyalkyl group having the general formula (2):

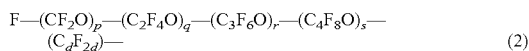  (2)

wherein p, q, r and s are each independently an integer of 0 to 200, the sum p+q+r+s is 3 to 200, d is an integer of 1 to 3, each repeating unit may be linear or branched, and individual repeating units may be randomly arranged.

In another preferred embodiment wherein a is 2, Rf is a divalent fluorooxyalkylene group having the general formula (3):

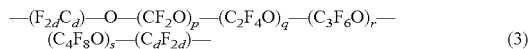  (3)

wherein p, q, r and s are each independently an integer of 0 to 200, the sum p+q+r+s is 3 to 200, d is an integer of 1 to 3, each repeating unit may be linear or branched, and individual repeating units may be randomly arranged.

In formulae (2) and (3), p, q, r and s are each independently an integer of 0 to 200, preferably p is an integer of 5 to 100, q is an integer of 5 to 100, r is an integer of 0 to 100, and s is an integer of 0 to 100. The sum p+q+r+s is 3 to 200, preferably 10 to 100. Each repeating unit may be linear or branched, and individual repeating units may be randomly arranged. More preferably p+q is an integer of 10 to 105, even more preferably 15 to 60, and r=s=0. If p+q+r+s is less than or equal to the upper limit, adhesion and cure are satisfactory. If p+q+r+s is greater than or equal to the lower limit, the fluoropolyether group fully exerts its characteristics.

In formulae (2) and (3), d is an integer of 1 to 3, preferably 1 or 2, and the relevant unit may be either linear or branched.

Examples of Rf are shown below.

$F(CF_2O)_pCF_2$—
$F(CF_2O)_p(CF_2CF_2O)_qCF_2$—
$F(CF_2O)_p(CF_2CF_2O)_q(CF_2CF_2CF_2O)_rCF_2$—
$F(CF_2O)_p(CF_2CF_2O)_q(CF_2CF_2CF_2CF_2O)_sCF_2$—
$F(CF_2O)_p(CF_2CF_2O)_q(CF_2CF_2CF_2O)_{r'}$
$(CF_2CF_2CF_2CF_2O)_sCF_2$—
$F(CF_2CF_2O)_qCF_2$—
$F(CF_2CF_2CF_2O)_rCF_2CF_2$—

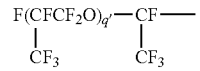

—$CF_2O(CF_2O)_pCF_2$—
—$CF_2O(CF_2O)_p(CF_2CF_2O)_qCF_2$—
—$CF_2(CF_2O)_p(CF_2CF_2O)_q(CF_2CF_2CF_2O)_sCF_2$—
—$CF_2O(CF_2O)_p(CF_2CF_2O)_q(CF_2CF_2CF_2CF_2O)_sCF_2$—
—$CF_2O(CF_2O)_p(CF_2CF_2O)_q(CF_2CF_2CF_2O)_{r'}$
$(CF_2CF_2CF_2CF_2O)_sCF_2$—
—$CF_2CF_2O(CF_2CF_2CF_2O)_rCF_2CF_2$—

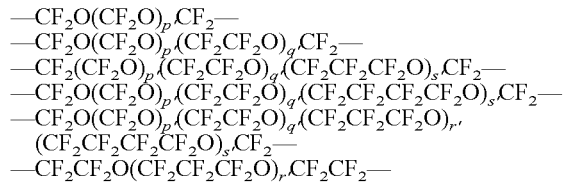

Herein p', q', r' and s' each are an integer of at least 1 and their upper limits are the same as defined for p, q, r and s. Each of u and v is a number of 1 to 24, satisfying u+v=r, and individual repeating units may be randomly arranged.

In formulae (1), A is a group having a structure selected from the following formulae.

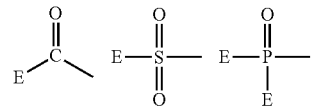

Herein E is a monovalent organic group which is preferably a substituted or unsubstituted monovalent hydrocarbon group of 1 to 10 carbon atoms, specifically 1 to 6 carbon atoms, alkoxy group of 1 to 6 carbon atoms or phenoxy group. Suitable groups include alkyl groups such as methyl, ethyl, propyl, isopropyl, butyl, isobutyl, sec-butyl, tert-butyl, pentyl, isopentyl, sec-pentyl, and tert-pentyl, siamyl, hexyl, isohexyl, sec-hexyl, tert-hexyl and thexyl; alkenyl groups such as vinyl, allyl and propenyl; aryl groups such as phenyl, tolyl and xylyl: aralkyl groups such as benzyl, phenylethyl and phenylpropyl; substituted forms of the foregoing in which some or all hydrogen atoms are substituted by halogen atoms (e.g., fluorine, bromine or chlorine), cyano, nitro or $C_1$-$C_3$ alkoxy, such as chloromethyl, chloropropyl, bromoethyl, trifluoromethyl, trifluoropropyl, nonafluorobutyl, cyanoethyl, nitrophenyl and methoxyphenyl; alkoxy groups such as methoxy, ethoxy, propoxy and butoxy; and phenoxy. More preferably E is $C_1$-$C_4$ alkyl, phenyl or tolyl.

Examples of group A are shown below.

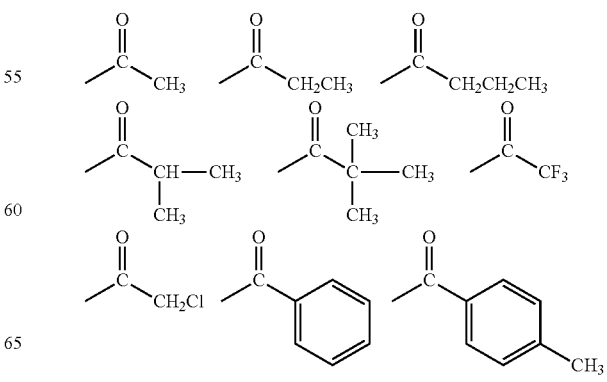

-continued

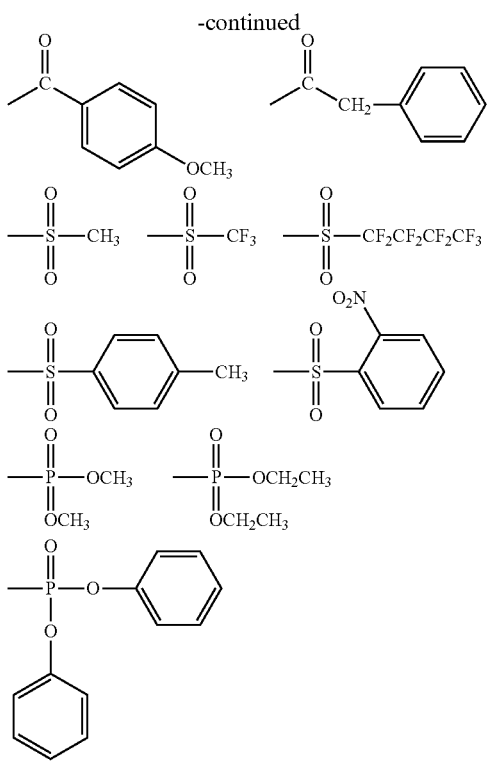

In formula (1), Y is a hydrocarbon group which is di- to hexavalent, preferably di- to tetravalent, and most preferably divalent, and which may contain a siloxane bond or silylene group. Specifically, Y is selected from the following: $C_3$-$C_{10}$ alkylene groups such as propylene (trimethylene or methylethylene), butylene (tetramethylene or methylpropylene), and hexamethylene; alkylene groups containing $C_6$-$C_8$ arylene, typically phenylene, such as $C_6$-$C_{16}$ alkylene-arylene groups; a divalent group having alkylene groups bonded via a silalkylene or silarylene structure; and a di- to hexavalent group having $C_2$-$C_{10}$ alkylene groups bonded to valence bonds of a di- to hexavalent, linear, branched or cyclic organopolysiloxane residue of 2 to 10 silicon atoms, preferably 2 to 5 silicon atoms. Preferably Y is a $C_3$-$C_{10}$, alkylene group, an alkylene group containing phenylene, a divalent group having alkylene groups bonded via a silalkylene or silarylene structure, or a di- to tetravalent group having $C_2$-$C_{10}$ alkylene groups bonded to valence bonds of a di- to tetravalent, linear organopolysiloxane residue of 2 to 10 silicon atoms or branched or cyclic organopolysiloxane residue of 3 to 10 silicon atoms, and more preferably $C_3$-$C_6$ alkylene group.

The silalkylene or silarylene structure is exemplified by the following structure.

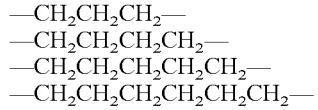

Herein $R^1$ which may be the same or different is a $C_1$-$C_4$ alkyl group such as methyl, ethyl, propyl or butyl, or $C_6$-$C_{10}$ aryl group such as phenyl. $R^2$ is a $C_1$-$C_4$ alkylene group such as methylene, ethylene, or propylene (trimethylene or methylethylene), or $C_6$-$C_{10}$ arylene group such as phenylene.

Examples of the di- to hexavalent, linear, branched or cyclic organopolysiloxane residue of 2 to 10 silicon atoms, preferably 2 to 5 silicon atoms are shown below.

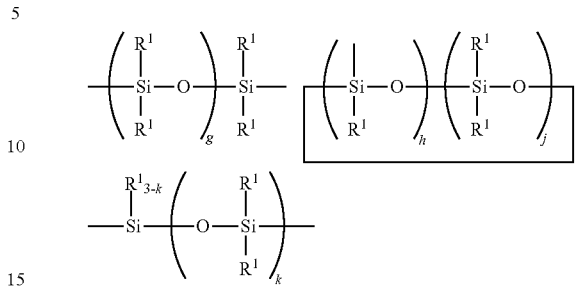

Herein $R^1$ is as defined above, g is an integer of 1 to 9, preferably 1 to 4, h is an integer of 2 to 6, preferably 2 to 4, j is an integer of 0 to 8, preferably 0 or 1, the sum h+j is an integer of 3 to 10, preferably 3 to 5, and k is an integer of 1 to 3, preferably 2 or 3.

Examples of Y are shown below.
—CH$_2$CH$_2$CH$_2$—
—CH$_2$CH$_2$CH$_2$CH$_2$—
—CH$_2$CH$_2$CH$_2$CH$_2$CH$_2$—
—CH$_2$CH$_2$CH$_2$CH$_2$CH$_2$CH$_2$—

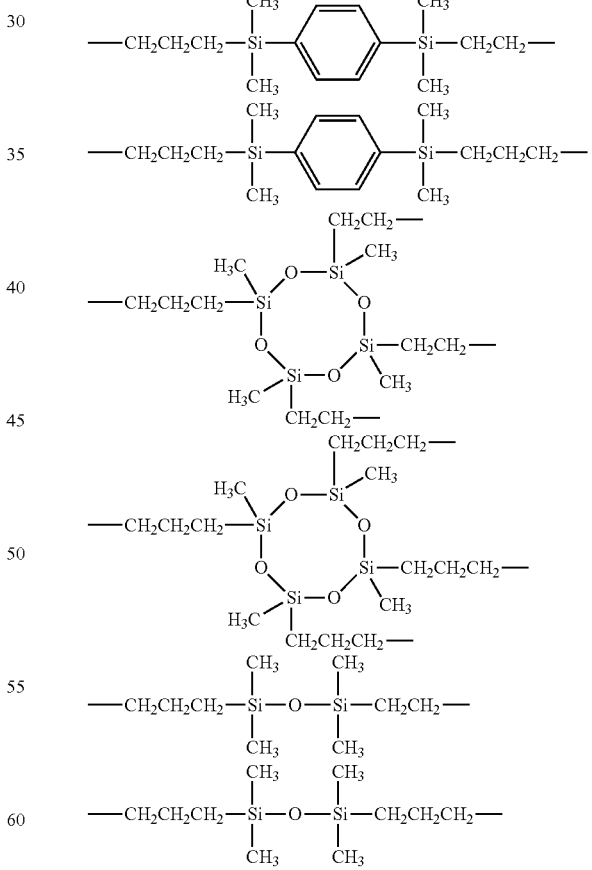

In formula (1), X is each independently a hydroxyl or hydrolyzable group. Examples of X include hydroxyl, $C_1$-$C_{10}$ alkoxy groups such as methoxy, ethoxy, propoxy, isopropoxy and butoxy, $C_2$-$C_{10}$, alkoxyalkoxy groups such as methoxymethoxy and methoxyethoxy, $C_1$-$C_{10}$ acyloxy groups such as acetoxy, $C_2$-$C_{10}$ alkenyloxy groups such as isopropenoxy, and halogen groups such as chloro, bromo and iodo. Inter alia, methoxy, ethoxy, isopropenoxy and chloro are preferred.

In formula (1), R is a $C_1$-$C_4$ alkyl group such as methyl, ethyl, propyl or butyl, or a phenyl group, with methyl being preferred. The subscript n is an integer of 1 to 3, preferably 2 or 3. It is most preferred from the standpoints of reactivity and adhesion to substrates that n be 3. The subscript m is an integer of 1 to 5. If m is less than 1, adhesion to substrates is poor. If m is more than 5, an excessively high terminal alkoxy number adversely affects the desired performance. Preferably m is 1, 2 or 3, and most preferably 1.

Examples of the fluoropolyether-containing polymer-modified silane of formula (1) are shown below. In each formula, the repetition number of repeating units in the form of fluorooxyalkyl or fluorooxyalkylene groups, also referred to as degree of polymerization, may be an arbitrary number meeting formula (2) or (3) representative of Rf.

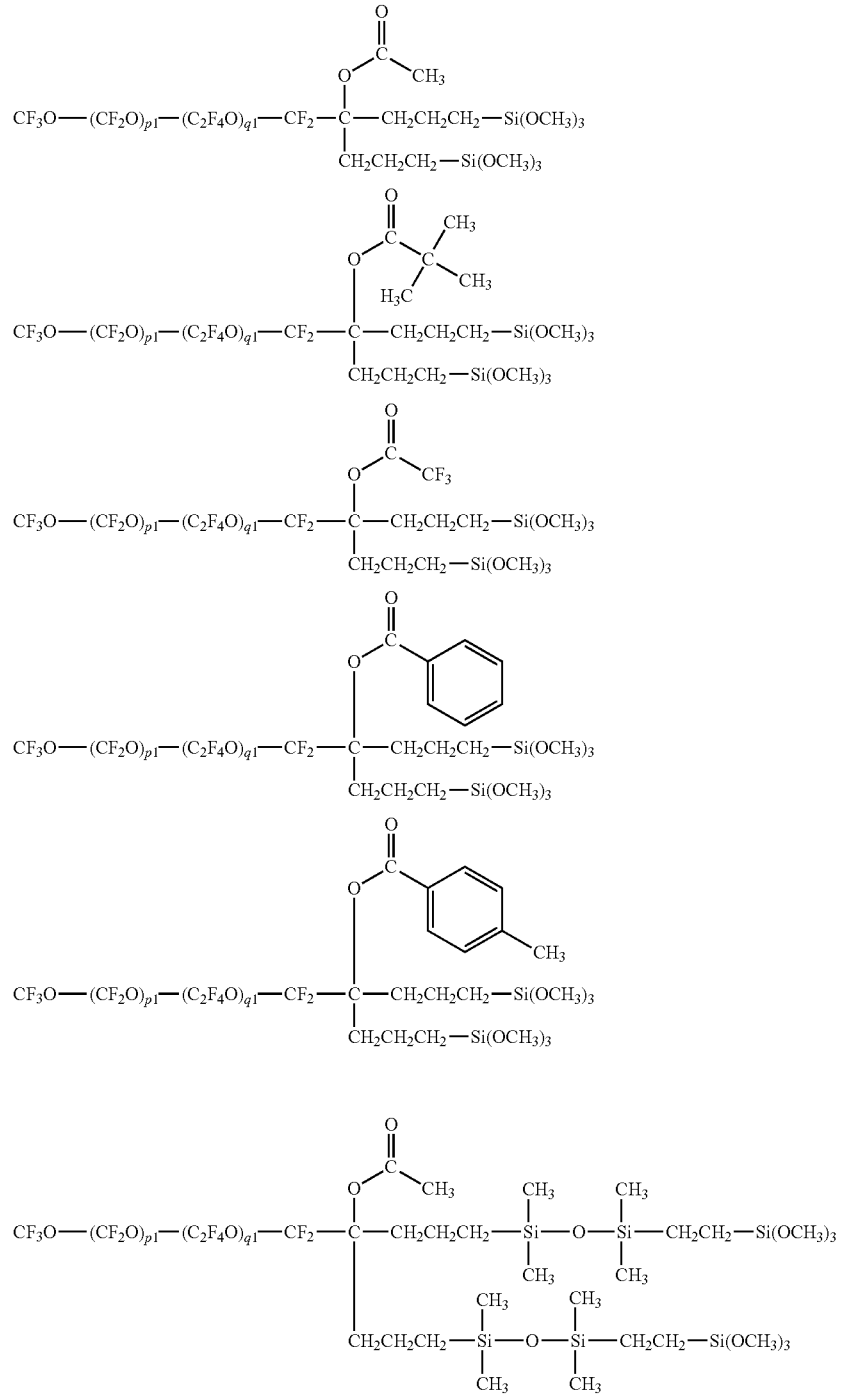

-continued

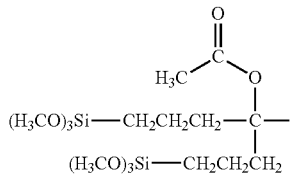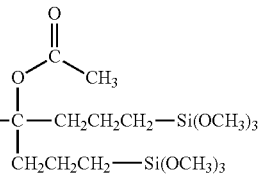

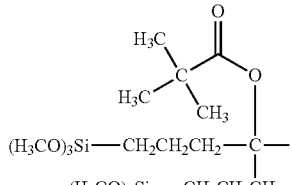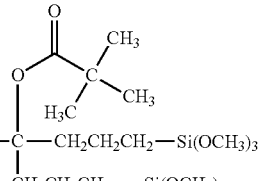

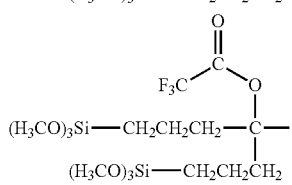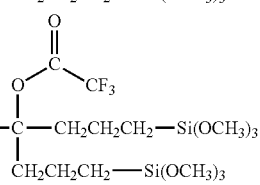

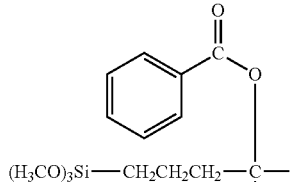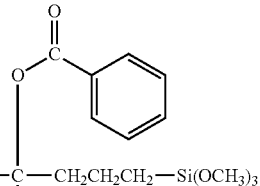

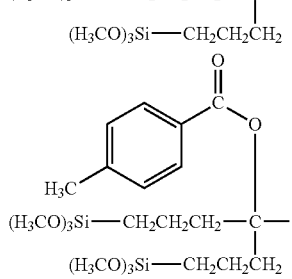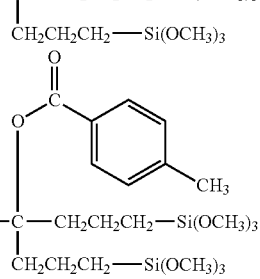

Herein p1 is an integer of 5 to 100, q1 is an integer of 5 to 100, and the sum p1+q1 is an integer of 10 to 105.

The fluoropolyether-containing polymer-modified silane of formula (1) wherein α=1 may be prepared, for example, by the following methods. In one exemplary method, a fluorooxyalkyl-containing polymer having two olefin sites at one end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trimethoxysilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 20 to 36 hours, and more preferably about 24 hours.

Another method may be employed for preparing the fluoropolyether-containing polymer-modified silane of formula (1) wherein α=1. A fluorooxyalkyl-containing polymer having two olefin sites at one end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trichlorosilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 20 to 36 hours, and more preferably about 24 hours. Finally, the substituent on the silyl group is converted to a methoxy group, for example.

Instead of the organosilicon compound having a SiH group and a hydrolyzable terminal group in the molecule, an SiH-containing organosilicon compound free of a hydrolyzable terminal group may also be used. In this case, an organosilicon compound having at least two SiH groups, but not hydrolyzable terminal group is used. Once the organosilicon compound having at least two SiH groups, but not hydrolyzable terminal group is reacted with a fluorooxyalkyl-containing polymer having two olefin sites at one end of the molecular chain like the above method, a mixture of the resulting polymer product having terminal SiH groups and an organosilicon compound having an olefin site and a hydrolyzable terminal group in the molecule such as allyltrimethoxysilane is aged, in the presence of a hydrosilylation catalyst such as a toluene solution of chloroplatinic acid/vinylsiloxane complex, at a temperature of 40 to 120° C., preferably 60 to 100° C., and more preferably about 80° C. for 1 to 72 hours, preferably 20 to 36 hours, and more preferably about 24 hours.

The fluorooxyalkyl-containing polymer having two olefin sites at one end of the molecular chain is typically a fluorooxyalkyl-containing polymer of the general formula (4).

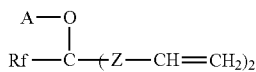
(4)

Herein Rf and A are as defined above. Z is a divalent hydrocarbon group.

In formula (4), Z is a divalent hydrocarbon group having 1 to 8 carbon atoms, preferably 1 to 4 carbon atoms. Suitable examples include $C_1$-$C_8$ alkylene groups such as methylene, ethylene, propylene (trimethylene or methylethylene), butylene (tetramethylene or methylpropylene), hexamethylene and octamethylene and alkylene groups containing $C_6$-$C_8$ arylene, typically phenylene, such as $C_7$-$C_8$ alkylene-arylene groups. Preferably Z is a $C_1$-$C_4$ linear alkylene group.

Preferred examples of the fluorooxyalkyl-containing polymer of formula (4) are shown below. In each formula, the repetition number of repeating units in the form of fluorooxyalkyl groups, also referred to as degree of polymerization, may be an arbitrary number meeting formula (2) representative of Rf.

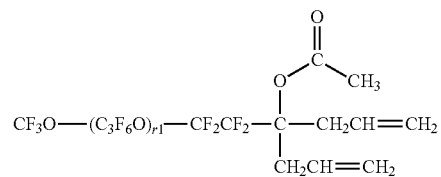

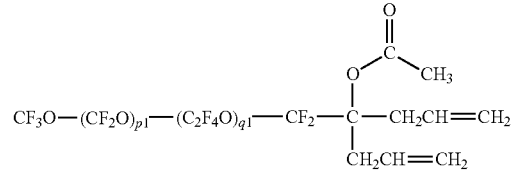

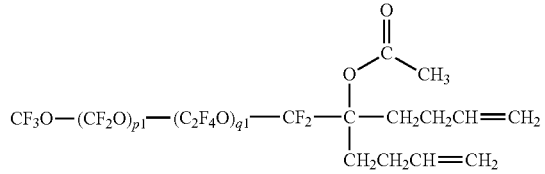

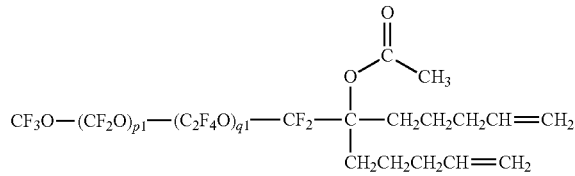

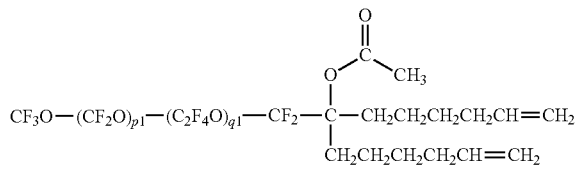

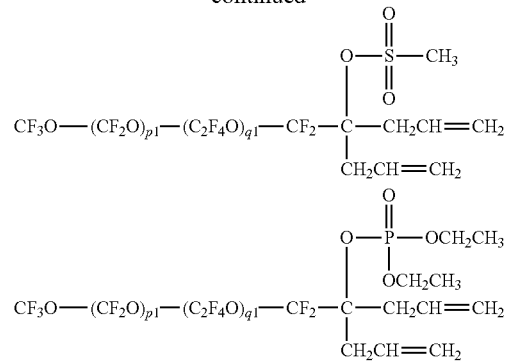

Herein r1 is an integer of 1 to 100, p1, q1 and p1+q1 are as defined above.

The fluorooxyalkyl-containing polymer of formula (4) may be prepared, for example, by the following method. A perfluorooxyalkyl-containing polymer having a hydroxyl group at one end of the molecular chain is mixed with an acylating, sulfonylating or phosphorylating agent and optionally a catalyst and a solvent, and aged in the presence of a base at a temperature of 0 to 100'C, preferably 50 to 70° C., and more preferably about 60° C. for 10 to 25 hours, preferably 15 to 20 hours, and more preferably about 18 hours.

Another method may be employed for preparing the fluorooxyalkyl-containing polymer of formula (4). A perfluorooxyalkyl-containing polymer having a reactive group at one end of the molecular chain is mixed with a nucleophilic reagent and a solvent. The mixture is aged at 0 to 80° C., preferably 50 to 70° C., and more preferably about 60° C. for 1 to 6 hours, preferably 3 to 5 hours, and more preferably about 4 hours, obtaining a reaction product between the perfluorooxyalkyl-containing polymer having a reactive group and the nucleophilic reagent. The reaction product was mixed with an acylating, sulfonylating or phosphorylating agent and optionally a catalyst and aged at 0 to 80° C., preferably 50 to 70° C., and more preferably about 60° C. for 1 to 10 hours, preferably 3 to 5 hours, and more preferably about 4 hours.

Examples of the perfluorooxyalkyl-containing polymer having a hydroxyl group at one end of the molecular chain used for preparation of the fluorooxyalkyl-containing polymer of formula (4) are given below.

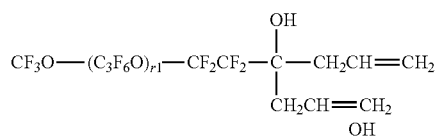

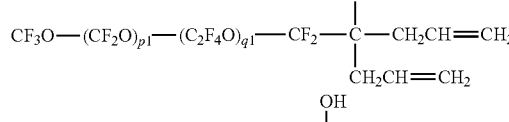

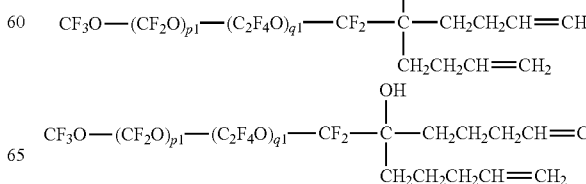

-continued

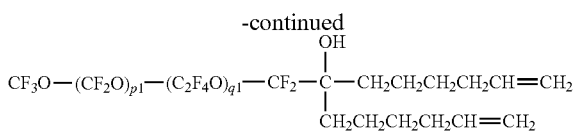

Herein r1, p1, q1 and p1+q1 are as defined above.

The perfluorooxyalkyl-containing polymer having a hydroxyl group at one end of the molecular chain may be prepared, for example, by the following method. A perfluorooxyalkyl-containing polymer having an acid fluoride group (—C(=O)—F) at one end of the molecular chain is mixed with a Grignard reagent as the nucleophilic reagent and a solvent such as 1,3-bis(trifluoromethyl)benzene, tetrahydrofuran or a mixture thereof, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkyl-containing polymer may have another group at one end of the molecular chain, such as acid halide, acid anhydride, ester, carboxylic acid or amide. Examples of the perfluorooxyalkyl-containing polymer having such a group at one end of the molecular chain are shown below.

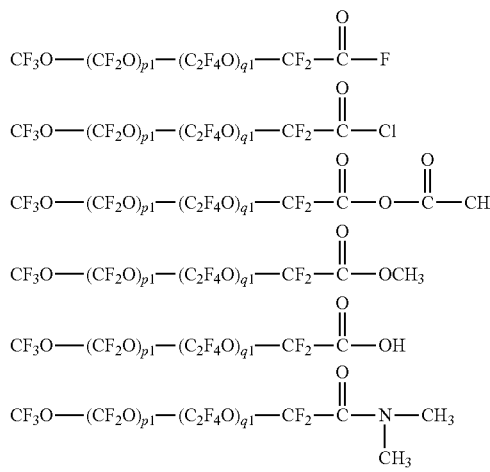

Herein p1, q1 and p1+q1 are as defined above.

The nucleophilic reagent used in the preparation of a perfluorooxyalkyl-containing polymer having a hydroxyl group at one end of the molecular chain may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 2 to 5 equivalents, preferably 2.5 to 3.5 equivalents, and more preferably about 3 equivalents per equivalent of reactive terminal group of the perfluorooxyalkyl-containing polymer having an acid fluoride or similar group at one end of the molecular chain.

As the solvent used in the preparation of a perfluorooxyalkyl-containing polymer having a hydroxyl group at one end of the molecular chain, suitable fluorochemical solvents include 1,3-bis(trifluoromethyl)benzene, trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the perfluorooxyalkyl-containing polymer having an acid fluoride or similar group at one end of the molecular chain.

Subsequently, the reaction is stopped. The reaction solution is separated into a water layer and a fluorochemical solvent layer (fluoro compound layer) by separatory operation. Once the fluorochemical solvent layer is washed with an organic solvent, the solvent is distilled off, yielding a perfluorooxyalkyl-containing polymer having a hydroxyl group at one end of the molecular chain.

The perfluorooxyalkyl-containing polymer having a reactive group at one end of the molecular chain used in the preparation of a fluorooxyalkyl-containing polymer of formula (4) may have an ester (—C(=O)—OR), acid halide, acid anhydride, carboxylic acid or amide as the reactive group at one end of the molecular chain. Examples of the perfluorooxyalkyl-containing polymer having such a reactive group at one end of the molecular chain are shown below.

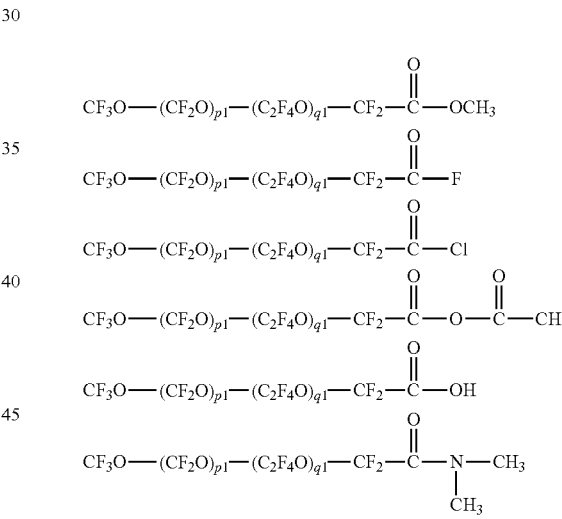

Herein p1, q1 and p1+q1 are as defined above.

The nucleophilic reagent used in the preparation of a fluorooxyalkyl-containing polymer of formula (4) may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 2 to 5 equivalents, preferably 2.5 to 3.5 equivalents, and more preferably about 3 equivalents per equivalent of reactive terminal group of the perfluorooxyalkyl-containing polymer having a reactive group at one end of the molecular chain.

Typical of the acylating agent used in the preparation of a fluorooxyalkyl-containing polymer of formula (4) are acyl halides. Suitable acylating agents include acetic anhydride, propionic anhydride, trifluoroacetic anhydride, benzoic anhydride, acetyl halides, propionyl halides, trifluoroacetyl halides, benzoyl halides, and methylbenzoyl halides such as p-toluoyl chloride. The acylating agent may be used in an amount of 1 to 10 equivalents, preferably 3 to 6 equivalents, and more preferably about 5 equivalents per equivalent of reactive terminal group of the perfluorooxyalkyl-containing polymer having a hydroxyl group or reactive terminal group of the reaction product of the perfluorooxyalkyl-containing polymer having a reactive group and the nucleophilic reagent.

Typical of the sulfonylating agent used in the preparation of a fluorooxyalkyl-containing polymer of formula (4) are sulfonyl halides including methanesulfonyl chloride, trifluoromethanesulfonic anhydride, nonafluorobutanesulfonyl fluoride, p-toluenesulfonyl chloride, and o-nitrobenzenesulfonyl chloride. Relative to the perfluorooxyalkyl-containing polymer having a hydroxyl group, the sulfonylating agent may be used in an amount of 1 to 10 equivalents, preferably 2 to 5 equivalents, and more preferably about 3 equivalents per equivalent of reactive terminal group of the polymer. Relative to the reaction product of the perfluorooxyalkyl-containing polymer having a reactive group and the nucleophilic reagent, the sulfonylating agent may be used in an amount of 1 to 10 equivalents, preferably 2 to 4 equivalents, and more preferably about 3 equivalents per equivalent of reactive terminal group of the reaction product.

Typical of the phosphorylating agent used in the preparation of a fluorooxyalkyl-containing polymer of formula (4) are phosphoryl halides including dimethylphosphoryl chloride, diethylphosphoryl chloride, and diphenylphosphoryl chloride. Relative to the perfluorooxyalkyl-containing polymer having a hydroxyl group, the phosphorylating agent may be used in an amount of 1 to 10 equivalents, preferably 2 to 5 equivalents, and more preferably about 3 equivalents per equivalent of reactive terminal group of the polymer.

Relative to the reaction product of the perfluorooxyalkyl-containing polymer having a reactive group and the nucleophilic reagent, the sulfonylating agent may be used in an amount of 1 to 10 equivalents, preferably 2 to 4 equivalents, and more preferably about 3 equivalents per equivalent of reactive terminal group of the reaction product.

Examples of the base used in the preparation of a fluorooxyalkyl-containing polymer of formula (4) are amines and alkali metal bases. Suitable amines include triethylamine, diisopropylethylamine, pyridine, DBU, imidazole, and tetrazole. Suitable alkali metal bases include sodium hydroxide, potassium hydroxide, sodium hydride, potassium hydride, alkyllithium, potassium tert-butoxide, lithium diisopropylamide, lithium bis(trimethylsilyl)amide, sodium bis(trimethylsilyl)amide, and potassium bis(trimethylsilyl)amide. The base may be used in an amount of 1 to 10 equivalents, preferably 3 to 7 equivalents, and more preferably about 5 equivalents per equivalent of reactive terminal group of the perfluorooxyalkyl-containing polymer having a hydroxyl group.

The catalyst used in the preparation of a fluorooxyalkyl-containing polymer of formula (4) may be selected from pyridine, N,N-dimethyl-4-aminopyridine, and 4-pyrrolidinopyridine, for example. The catalyst is preferably used in an amount of 0.01 to 0.2 equivalent, more preferably 0.025 to 0.075 equivalent, and even more preferably about 0.05 equivalent per equivalent of reactive terminal group of the perfluorooxyalkyl-containing polymer having a hydroxyl group or reactive terminal group of the reaction product of the perfluorooxyalkyl-containing polymer having a reactive group and the nucleophilic reagent.

As the solvent used in the preparation of a fluorooxyalkyl-containing polymer(4), suitable fluorochemical solvents include fluorinated aromatic hydrocarbon solvents such as 1,3-bis(trifluoromethyl)benzene and trifluoromethylbensene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether and dioxane and polar solvents such as dimethylformamide, dimethylacetamide, N-methylpyrrolidone, dimethyl sulfoxide and acetonitrile. The solvent may be used in an amount of 10 to 300 parts, preferably 50 to 150 parts, and more preferably about 100 parts by weight per 100 parts by weight of the perfluorooxyalkyl-containing polymer having a hydroxyl group or reactive group.

Subsequently, the reaction is stopped. The reaction solution is separated into an organic or water layer and a fluorochemical solvent layer (fluoro compound layer) by separatory operation. Once the fluorochemical solvent layer is washed with an organic solvent, the solvent is distilled off, yielding a fluorooxyalkyl-containing polymer of formula (4).

As mentioned previously, the method for the preparation of a fluoropolyether-containing polymer-modified silane having formula (1) wherein α=1 uses a solvent. As the solvent, fluorochemical solvents are preferred and include fluorinated aromatic hydrocarbon solvents such as 1,3-bis(trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). The solvent may be used in an amount of 10 to 300 parts, preferably 50 to 150 parts, and more preferably about 100 parts by weight per 100 parts by weight of the fluorooxyalkyl-containing polymer having two olefin sites at one end of the molecular chain.

The organosilicon compound having a SiH group and a hydrolyzable terminal group in the molecule used in the preparation of a fluoropolyether-containing polymer-modified silane of formula (1) wherein α=1 is preferably selected from compounds having the general formulae (5) to (8).

(5)

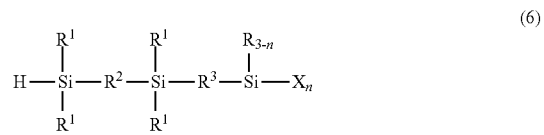

(6)

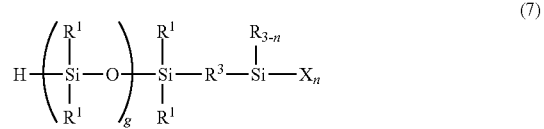

(7)

-continued

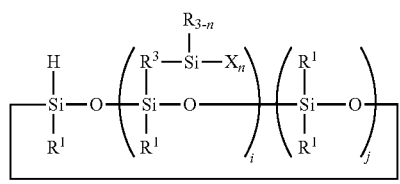
(8)

Herein R, X, n, $R^1$, $R^2$, g and j are as defined above, $R^3$ is a $C_2$-$C_8$ divalent hydrocarbon group, i is an integer of 2 to 9, preferably 2 to 4, and the sum i+j is an integer of 2 to 9.

$R^3$ is a $C_2$-$C_8$, preferably $C_2$-$C_3$ divalent hydrocarbon group, examples of which include alkylene groups such as methylene, ethylene, propylene (trimethylene or methylethylene), butylene (tetramethylene or methylpropylene), hexamethylene and octamethylene, arylene groups such as phenylene, and combinations of two or more of the foregoing such as alkylene-arylene groups. Inter alia, ethylene and trimethylene are preferred.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as organosilicon compounds of the following formulae.

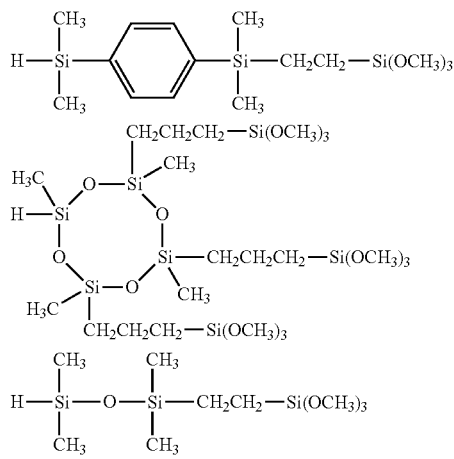

In the reaction of the fluorooxyalkyl-containing polymer having two olefin sites at one end of the molecular chain with the organosilicon compound having a SiH group and a hydrolyzable terminal group in the molecule for preparation of the fluoropolyether-containing polymer-modified silane of formula (1) wherein α=1, the organosilicon compound may be used in an amount of 3 to 9 equivalents, preferably 5 to 7 equivalents, and more preferably about 6 equivalents per equivalent of reactive terminal group of the polymer.

The organosilicon compound having at least two SiH groups, but not hydrolyzable terminal groups in the molecule used in the preparation of a fluoropolyether-containing polymer-modified silane of formula (1) wherein α=1 is preferably selected from compounds having the general formulae (9) to (11).

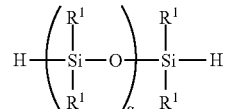
(9)

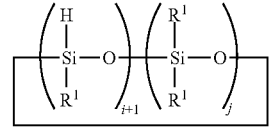
(10)

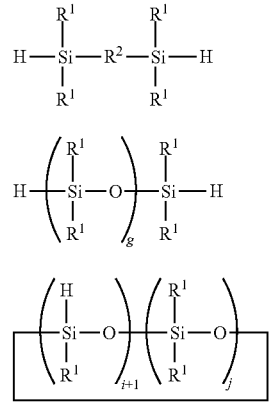
(11)

Herein $R^1$, $R^2$, g, i and j are as defined above.

Examples of the organosilicon compound having at least two SiH groups, but not hydrolyzable terminal groups in the molecule are shown below.

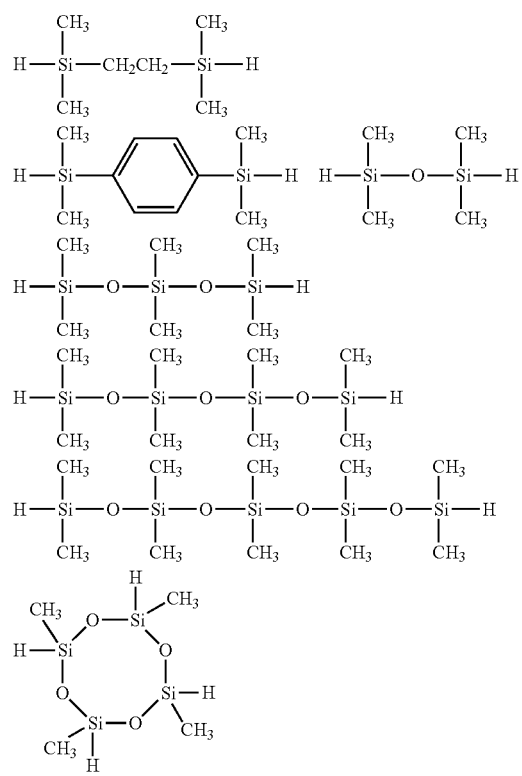

In the reaction of the fluorooxyalkyl-containing polymer having two olefin sites at one end of the molecular chain with the organosilicon compound having at least two SiH groups, but not hydrolyzable terminal groups for preparation of the fluoropolyether-containing polymer-modified silane of formula (1) wherein α=1, the organosilicon compound may be used in an amount of 5 to 20 equivalents, preferably 7.5 to 12.5 equivalents, and more preferably about 10 equivalents per equivalent of reactive terminal group of the polymer.

The organosilicon compound having an olefin site and a hydrolyzable terminal group in the molecule used in the preparation of a fluoropolyether-containing polymer-modified silane of formula (1) wherein α=1 is preferably selected from compounds having the general formula (12).

Herein R, X and n are as defined above. V is a single bond or a divalent hydrocarbon group of 1 to 6 carbon atoms.

In formula (12), V is a single bond or a $C_1$-$C_6$ divalent hydrocarbon group. Examples of the $C_1$-$C_6$ divalent hydrocarbon group include alkylene groups such as methylene, ethylene, propylene (trimethylene or methylethylene), butylene (tetramethylene or methylpropylene) and hexamethylene, and a phenylene group. Preferably V is a single bond or methylene.

In the reaction of the reaction product between the fluorooxyalkyl-containing polymer having two olefin sites at one end of the molecular chain and the organosilicon compound having at least two SiH groups, but not hydrolyzable terminal groups in the molecule with the organosilicon compound having an olefin site and a hydrolyzable terminal group in the molecule for preparation of the fluoropolyether-containing polymer-modified silane of formula (1) wherein α=1, the latter organosilicon compound may be used in an amount of 2 to 6 equivalents, preferably 2.2 to 3.5 equivalents, and more preferably about 3 equivalents per equivalent of reactive terminal group of the reaction product of the fluorooxyalkyl-containing polymer and the former organosilicon compound.

Typical of the hydrosilylation catalyst used in the preparation of a fluoropolyether-containing polymer-modified silane of formula (1) wherein α=1 are platinum group metal based catalysts including platinum black, chloroplatinic acid, alcohol-modified chloroplatinic acid, complexes of chloroplatinic acid with olefin, aldehyde, vinylsiloxane, and acetylene alcohol, tetrakis(triphenylphosphine)palladium, and chlorotris(triphenylphosphine)rhodium. Inter alia, platinum compounds such as vinylsiloxane coordination compounds are preferred. The hydrosilylation catalyst is preferably used in an amount to provide 0.1 to 100 ppm, more preferably 1 to 50 ppm of transition metal based on the weight of the fluorooxyalkyl-containing polymer having two olefin sites at one end of the molecular chain or the reaction product between the polymer and the organosilicon compound having at least two SiH groups, but not hydrolyzable terminal groups.

Referring back to the process, the solvent and unreacted reactants are distilled off from the aged reaction solution in vacuum, yielding the target compound. For example, when the fluorooxyalkyl-containing polymer having two olefin sites at one end of the molecular chain is of the formula:

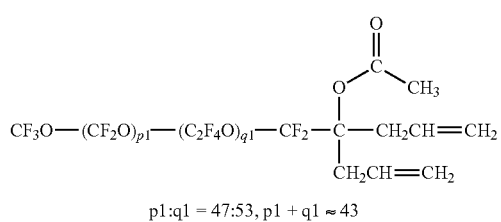

p1:q1 = 47:53, p1 + q1 ≈ 43 and the organosilicon compound having a SiH group and a hydrolyzable terminal group in the molecule is trimethoxysilane, there is obtained a compound of the following formula.

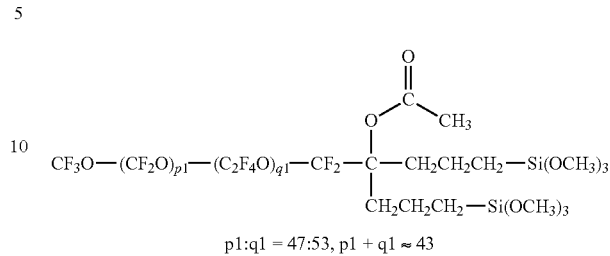

p1:q1 = 47:53, p1 + q1 ≈ 43

Next, the fluoropolyether-containing polymer-modified silane of formula (1) wherein α=2 may be prepared, for example, by the following methods. In one exemplary method, a fluorooxyalkylene-containing polymer having two olefin sites at each end of the molecular chain is dissolved in a solvent, typically fluorochemical solvent such as 1,3-bis(trifluoromethyl)benzene. To the solution, an organosilicon compound having a SiH group and a hydrolyzable terminal group in the molecule such as trimethoxysilane and a hydrosilylation catalyst such as a toluene solution of chloroplatinic acid/vinylsiloxane complex are added. The reaction mixture is aged at a temperature of 40 to 120° C., preferably 60 to 100° C., and more preferably about 80° C. for 1 to 72 hours, preferably 20 to 36 hours, and more preferably about 24 hours.

Instead of the organosilicon compound having a SiH group and a hydrolyzable terminal group in the molecule, an SiH-containing organosilicon compound free of a hydrolyzable terminal group may also be used. In this case, an organosilicon compound having at least two SiH groups, but not hydrolyzable terminal group is used. Once the organosilicon compound having at least two SiH groups, but not hydrolyzable terminal group is reacted with a fluorooxyalkylene-containing polymer having two olefin sites at each end of the molecular chain like the above method, a mixture of the resulting polymer product having terminal SiH groups and an organosilicon compound having an olefin site and a hydrolyzable terminal group in the molecule such as allyltrimethoxysilane is aged, in the presence of a hydrosilylation catalyst such as a toluene solution of chloroplatinic acid/vinylsiloxane complex, at a temperature of 40 to 120'C, preferably 60 to 100° C., and more preferably about 80° C. for 1 to 72 hours, preferably 20 to 36 hours, and more preferably about 24 hours.

The fluorooxyalkylene-containing polymer having two olefin sites at each end of the molecular chain is typically a fluorooxyalkylene-containing polymer of the general formula (13):

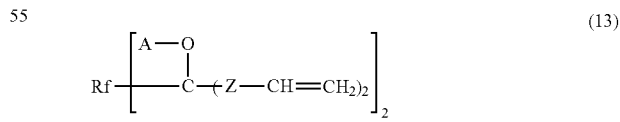

wherein Rf, A and Z are as defined above.

Preferred examples of the fluorooxyalkylene-containing polymer of formula (13) are shown below. In each formula, the repetition number of repeating units in the form of fluorooxyalkylene groups, also referred to as degree of polymerization, may be an arbitrary number meeting formula (3) representative of Rf.

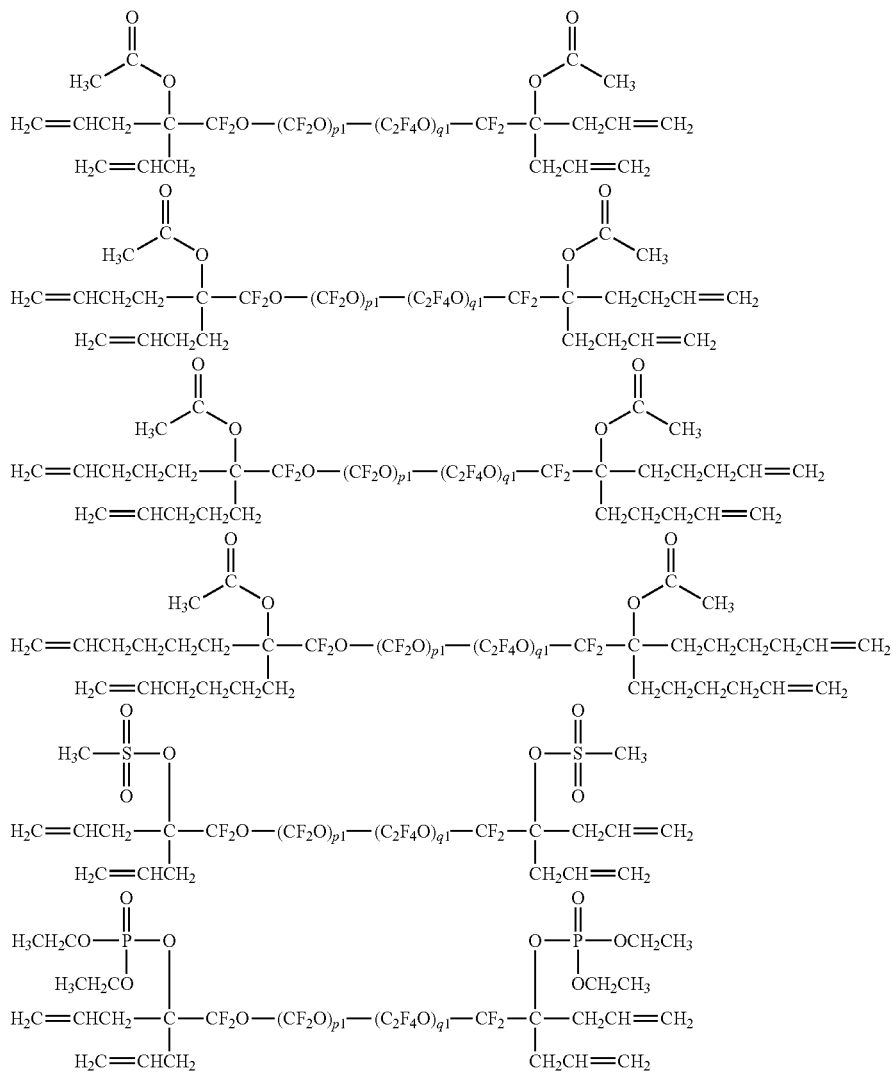

Herein p1, q1 and p1+q1 are as defined above.

The fluorooxyalkylene-containing polymer of formula (13) may be prepared, for example, by the following method. A perfluorooxyalkylene-containing polymer having a hydroxyl group at each end of the molecular chain is mixed with an acylating, sulfonylating or phosphorylating agent and optionally a catalyst and a solvent, and aged in the presence of a base at a temperature of 0 to 100° C., preferably 50 to 70° C., and more preferably about 60° C. for 10 to 25 hours, preferably 15 to 20 hours, and more preferably about 18 hours.

Another method may be employed for preparing the fluorooxyalkylene-containing polymer of formula (13). A perfluorooxyalkylene-containing polymer having a reactive group at each end of the molecular chain is mixed with a nucleophilic reagent and a solvent. The mixture is aged at 0 to 80° C., preferably 50 to 70° C., and more preferably about 60° C. for 1 to 6 hours, preferably 3 to 5 hours, and more preferably about 4 hours, obtaining a reaction product between the perfluorooxyalkylene-containing polymer having a reactive group and the nucleophilic reagent. The reaction product is mixed with an acylating, sulfonylating or phosphorylating agent and optionally a catalyst and aged at 0 to 80° C., preferably 50 to 70'C, and more preferably about 60° C. for 1 to 10 hours, preferably 3 to 5 hours, and more preferably about 4 hours.

Examples of the perfluorooxyalkylene-containing polymer having a hydroxyl group at each end of the molecular chain used for preparation of the fluorooxyalkylene-containing polymer of formula (13) are given below.

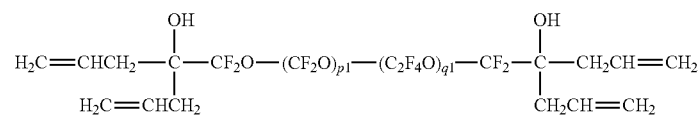

-continued

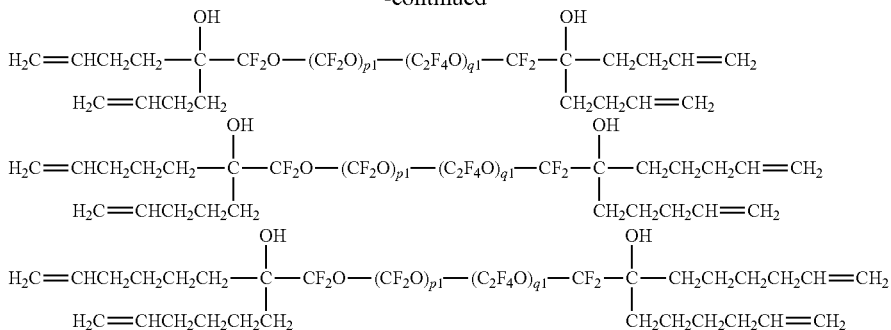

Herein p1, q1 and p1+q1 are as defined above.

The perfluorooxyalkylene-containing polymer having a hydroxyl group at each end of the molecular chain may be prepared, for example, by the following method. A perfluorooxyalkylene-containing polymer having an acid fluoride group (—C(=O)—F) at each end of the molecular chain is mixed with a Grignard reagent as the nucleophilic reagent and a solvent such as 1,3-bis(trifluoromethyl)benzene, tetrahydrofuran or a mixture thereof, and aged at a temperature of 0 to 80° C., preferably 50 to 70° C., and more preferably about 60° C. for 1 to 6 hours, preferably 3 to 5 hours, and more preferably about 4 hours.

Besides the acid fluoride, the perfluorooxyalkylene-containing polymer may have another group at each end of the molecular chain, such as acid halide, acid anhydride, ester, carboxylic acid or amide. Examples of the perfluorooxyalkylene-containing polymer having such a group at each end of the molecular chain are shown below.

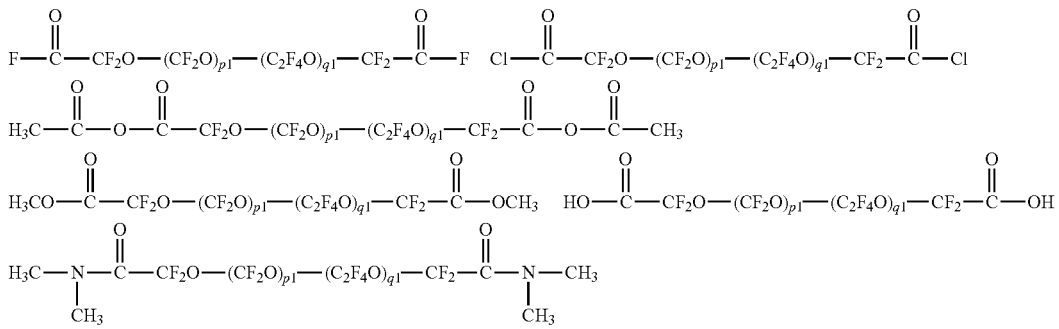

Herein p1, q1 and p1+q1 are as defined above

The nucleophilic reagent used in the preparation of a perfluorooxyalkylene-containing polymer having a hydroxyl group at each end of the molecular chain may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 4 to 10 equivalents, preferably 5 to 7 equivalents, and more preferably about 6 equivalents per equivalent of reactive terminal group of the perfluorooxyalkylene-containing polymer having an acid fluoride or similar group.

As the solvent used in the preparation of a perfluorooxyalkylene-containing polymer having a hydroxyl group at each end of the molecular chain, suitable fluorochemical solvents include 1,3-bis(trifluoromethyl)benzene, trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether, and dioxane. The solvent may be used in an amount of 10 to 300 parts, preferably 100 to 200 parts, and more preferably about 150 parts by weight per 100 parts by weight of the perfluorooxyalkylene-containing polymer having an acid fluoride or similar group.

Subsequently, the reaction is stopped. The reaction solution is separated into a water layer and a fluorochemical solvent layer (fluoro compound layer) by separatory operation. Once the fluorochemical solvent layer is washed with an organic solvent, the solvent is distilled off, yielding a perfluorooxyalkylene-containing polymer having a hydroxyl group at each end of the molecular chain.

The perfluorooxyalkylene-containing polymer having a reactive group at each end of the molecular chain used in the preparation of a fluorooxyalkylene-containing polymer of formula (13) may have an ester (—C(=O)—OR), acid halide, acid anhydride, carboxylic acid or amide as the reactive group at each end of the molecular chain. Examples of the perfluorooxyalkylene-containing polymer having such a reactive group at each end of the molecular chain are shown below.

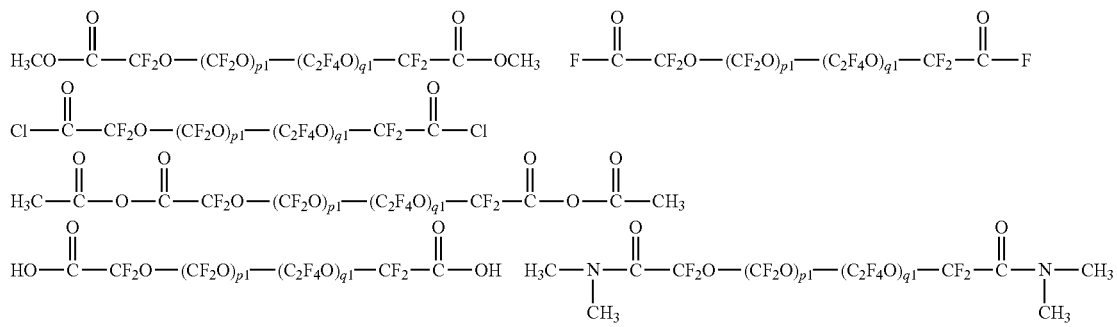

Herein p1, q1 and p1+q1 are as defined above.

The nucleophilic reagent used in the preparation of a fluorooxyalkylene-containing polymer of formula (13) may be selected from allylmagnesium halides, 3-butenylmagnesium halides, 4-pentenylmagnesium halides, and 5-hexenylmagnesium halides, for example. Corresponding lithium reagents may also be used. The nucleophilic reagent may be used in an amount of 2 to 5 equivalents, preferably 2.5 to 3.5 equivalents, and more preferably about 3 equivalents per equivalent of reactive terminal group of the to perfluorooxyalkylene-containing polymer having a reactive group at each end of the molecular chain.

Typical of the acylating agent used in the preparation of a fluorooxyalkylene-containing polymer of formula (13) are acyl halides. Suitable acylating agents include acetic anhydride, propionic anhydride, trifluoroacetic anhydride, benzoic anhydride, acetyl halides, propionyl halides, trifluoroacetyl halides, and benzoyl halides. Relative to the perfluorooxyalkylene-containing polymer having a hydroxyl group, the acylating agent may be used in an amount of 1 to 10 equivalents, preferably 3 to 6 equivalents, and more preferably about 5 equivalents per equivalent of reactive terminal group of the polymer. Relative to the reaction product of the perfluorooxyalkyl-containing polymer having a reactive group and the nucleophilic reagent, the acylating agent may be used in an amount of 1 to 10 equivalents, preferably 4.5 to 5.5 equivalents, and more preferably about 5 equivalents per equivalent of reactive terminal group of the reaction product.

Typical of the sulfonylating agent used in the preparation of a fluorooxyalkylene-containing polymer of formula (13) are sulfonyl halides including methanesulfonyl chloride, trifluoromethanesulfonic anhydride, nonafluorobutanesulfonyl fluoride, p-toluenesulfonyl chloride, and o-nitrobenzenesulfonyl chloride. Relative to the perfluorooxyalkylene-containing polymer having a hydroxyl group, the sulfonylating agent may be used in an amount of 1 to 10 equivalents, preferably 2 to 5 equivalents, and more preferably about 3 equivalents per equivalent of reactive terminal group of the polymer. Relative to the reaction product of the perfluorooxyalkyl-containing polymer having a reactive group and the nucleophilic reagent, the sulfonylating agent may be used in an amount of 1 to 10 equivalents, preferably 2 to 4 equivalents, and more preferably about 3 equivalents per equivalent of reactive terminal group of the reaction product.

Typical of the phosphorylating agent used in the preparation of a fluorooxyalkylene-containing polymer of formula (13) are phosphoryl halides including dimethylphosphoryl chloride, diethylphosphoryl chloride, and diphenylphosphoryl chloride. Relative to the perfluorooxyalkylene-containing polymer having a hydroxyl group, the phosphorylating agent may be used in an amount of 1 to 10 equivalents, preferably 2 to 5 equivalents, and more preferably about 3 equivalents per equivalent of reactive terminal group of the polymer. Relative to the reaction product of the perfluorooxyalkyl-containing polymer having a reactive group and the nucleophilic reagent, the sulfonylating agent may be used in an amount of 1 to 10 equivalents, preferably 2 to 4 equivalents, and more preferably about 3 equivalents per equivalent of reactive terminal group of the reaction product.

Examples of the base used in the preparation of a fluorooxyalkylene-containing polymer of formula (13) are amines and alkali metal bases. Suitable amines include triethylamine, diisopropylethylamine, pyridine, DBU, imidazole, and tetrazole. Suitable alkali metal bases include sodium hydroxide, potassium hydroxide, sodium hydride, potassium hydride, alkyllithium, potassium tert-butoxide, lithium diisopropylamide, lithium bis(trimethylsilyl)amide, sodium bis(trimethylsilyl)amide, and potassium bis(trimethylsilyl)amide. The base may be used in an amount of 1 to 10 equivalents, preferably 3 to 6 equivalents, and more preferably about 5 equivalents per equivalent of reactive terminal group of the perfluorooxyalkylene-containing polymer having a hydroxyl group.

The catalyst used in the preparation of a fluorooxyalkylene-containing polymer of formula (13) may be selected from pyridine, N,N-dimethyl-4-aminopyridine, and 4-pyrrolidinopyridine, for example. The catalyst is preferably used in an amount of 0.01 to 0.2 equivalent, more preferably 0.025 to 0.075 equivalent, and even more preferably about 0.05 equivalent per equivalent of reactive terminal group of the perfluorooxyalkylene-containing polymer having a hydroxyl group or reactive terminal group of the reaction product of the perfluorooxyalkylene-containing polymer having a reactive group and the nucleophilic reagent.

As the solvent used in the preparation of a fluorooxyalkylene-containing polymer(13), suitable fluorochemical solvents include fluorinated aromatic hydrocarbon solvents such as 1,3-bis(trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,5,5,5-decafluoro-3-methoxy-2-(trifluoromethyl)pentane, and perfluoro solvents composed of perfluorinated compounds (commercially available as Fluorinert® products from 3M). Organic solvents are also useful, for example, ether solvents such as tetrahydrofuran, monoethylene glycol dimethyl ether, diethylene glycol dimethyl ether, triethylene glycol dimethyl ether, tetraethylene glycol dimethyl ether and dioxane and polar solvents such as dimethylformamide, dimethylacetamide, N-methylpyrrolidone, dimethyl sulfoxide and acetonitrile. The solvent may be used in an amount of 10 to 300 parts, preferably 50 to 150 parts, and more preferably about 100 parts by weight per 100 parts by weight of the perfluorooxyalkylene-containing polymer having a hydroxyl group or reactive group.

Subsequently, the reaction is stopped. The reaction solution is separated into an organic or water layer and a fluorochemical solvent layer (fluoro compound layer) by separatory operation. Once the fluorochemical solvent layer is washed with an organic solvent, the solvent is distilled off, yielding a fluorooxyalkylene-containing polymer of formula (13).

As mentioned previously, the method for the preparation of a fluoropolyether-containing polymer-modified silane having formula (1) wherein α=2 uses a solvent. As the solvent, fluorochemical solvents are preferred and include fluorinated aromatic hydrocarbon solvents such as 1,3-bis (trifluoromethyl)benzene and trifluoromethylbenzene, hydrofluoroether (HFE) solvents (commercially available as Novec® products from 3M) such as methyl nonafluorobutyl ether, methyl nonafluoroisobutyl ether, ethyl nonafluorobutyl ether, ethyl nonafluoroisobutyl ether and 1,1,1,2,3,4,4,5,5,5-decafluoro-3-methoxy-2-(trifluoromethyl)-pentane, and perfluoro solvents composed of perfluorinated compounds (commercially available as Fluorinert® products from 3M). The solvent may be used in an amount of 10 to 300 parts, preferably 50 to 150 parts, and more preferably about 100 parts by weight per 100 parts by weight of the fluorooxyalkylene-containing polymer having two olefin sites at each end of the molecular chain.

The organosilicon compound having a SiH group and a hydrolyzable terminal group in the molecule used in the preparation of a fluoropolyether-containing polymer-modified silane of formula (1) wherein α=2 is preferably selected from compounds having the general formulae (5) to (8).

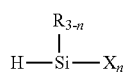

(5)

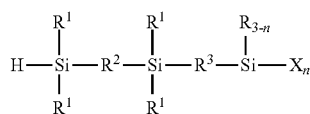

(6)

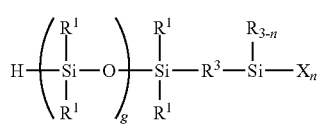

(7)

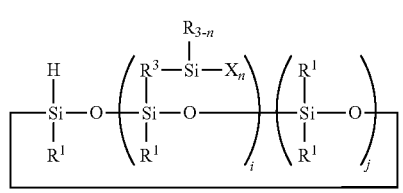

(8)

Herein R, X, n, $R^1$, $R^2$, $R^3$, g, i and j are as defined above.

Examples of the organosilicon compound having a SiH group and a hydrolyzable terminal group in the molecule include trimethoxysilane, triethoxysilane, tripropoxysilane, triisopropoxysilane, tributoxysilane, triisopropenoxysilane, triacetoxysilane, trichlorosilane, tribromosilane, and triiodosilane as well as organosilicon compounds of the following formulae.

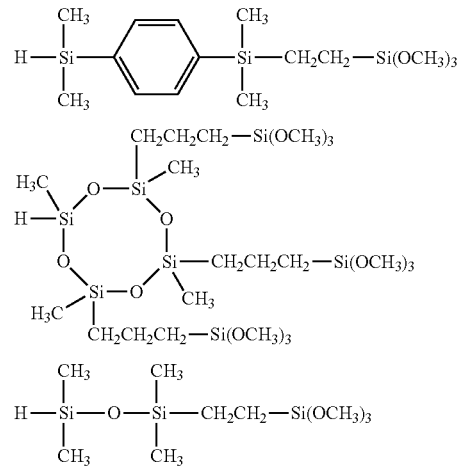

In the reaction of the fluorooxyalkylene-containing polymer having two olefin sites at each end of the molecular chain with the organosilicon compound having a SiH group and a hydrolyzable terminal group in the molecule for preparation of the fluoropolyether-containing polymer-modified silane of formula (1) wherein α=2, the organosilicon compound may be used in an amount of 4 to 12 equivalents, preferably 4.4 to 7 equivalents, and more preferably about 6 equivalents per equivalent of reactive terminal group of the polymer.

The organosilicon compound having at least two SiH groups, but not hydrolyzable terminal groups in the molecule used in the preparation of a fluoropolyether-containing polymer-modified silane of formula (1) wherein α=2 is preferably selected from compounds having the general formulae (9) to (11).

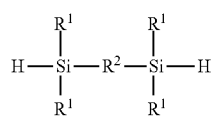

(9)

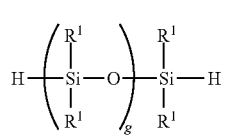

(10)

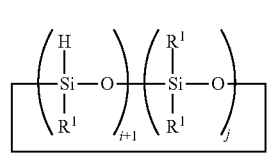

(11)

Herein $R^1$, $R^2$, g, i and j are as defined above.

Examples of the organosilicon compound having at least two SiH groups, but not hydrolyzable terminal groups in the molecule are shown below.

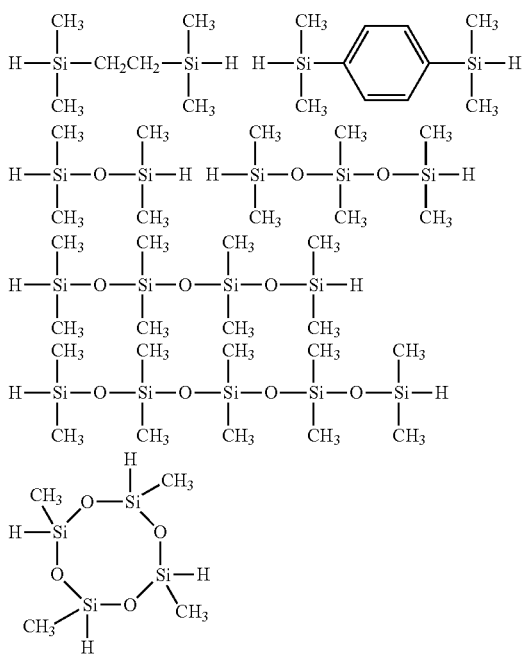

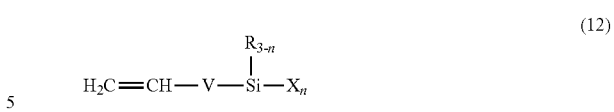

Herein R, X, V and n are as defined above.

In the reaction of the reaction product between the fluorooxyalkylene-containing polymer having two olefin sites at each end of the molecular chain and the organosilicon compound having at least two SiH groups, but not hydrolyzable terminal groups in the molecule with the organosilicon compound having an olefin site and a hydrolyzable terminal group in the molecule for preparation of the fluoropolyether-containing polymer-modified silane of formula (1) wherein α=2, the latter organosilicon compound may be used in an amount of 2 to 6 equivalents, preferably 2.2 to 3.5 equivalents, and more preferably about 3 equivalents per equivalent of reactive terminal group of the reaction product of the fluorooxyalkylene-containing polymer and the former organosilicon compound.

Typical of the hydrosilylation catalyst used in the preparation of a fluoropolyether-containing polymer-modified silane of formula (1) wherein α=2 are platinum group metal based catalysts including platinum black, chloroplatinic acid, alcohol-modified chloroplatinic acid, complexes of chloroplatinic acid with olefin, aldehyde, vinylsiloxane, and acetylene alcohol, tetrakis(triphenylphosphine)palladium, and chlorotris(triphenylphosphine)rhodium. Inter alia, platinum compounds such as vinylsiloxane coordination compounds are preferred. The hydrosilylation catalyst is preferably used in an amount to provide 0.1 to 100 ppm, more preferably 1 to 50 ppm of transition metal based on the weight of the fluorooxyalkylene-containing polymer having two olefin sites at each end of the molecular chain or the reaction product between the polymer and the organosilicon compound having at least two SiH groups, but not hydrolyzable terminal groups.

In the reaction of the fluorooxyalkylene-containing polymer having two olefin sites at each end of the molecular chain with the organosilicon compound having at least two SiH groups, but not hydrolyzable terminal groups for preparation of the fluoropolyether-containing polymer-modified silane of formula (1) wherein α=2, the organosilicon compound may be used in an amount of 5 to 20 equivalents, preferably 7.5 to 12.5 equivalents, and more preferably about 10 equivalents per equivalent of reactive terminal group of the polymer.

The organosilicon compound having an olefin site and a hydrolyzable terminal group in the molecule used in the preparation of a fluoropolyether-containing polymer-modified silane of formula (1) wherein α=2 is preferably selected from compounds having the general formula (12).

Referring back to the process, the solvent and unreacted reactants are distilled off from the aged reaction solution in vacuum, yielding the target compound. For example, when the fluorooxyalkylene-containing polymer having two olefin sites at each end of the molecular chain is of the formula:

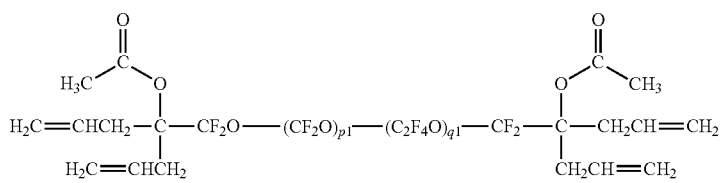

p1:q1 = 47:53, p1 + q1 ≈ 43 and the organosilicon compound having a SiH group and a hydrolyzable terminal group in the molecule is trimethoxysilane, there is obtained a compound of the following formula.

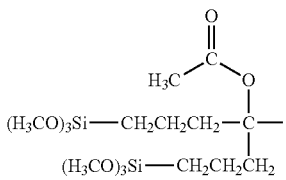
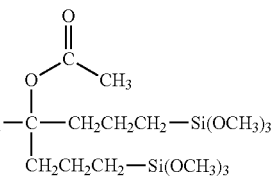

p1:q1 = 47:53, p1 + q1 ≈ 43

Also useful in the practice of the invention is a partial hydrolyzate form of the fluoropolyether-containing polymer-modified silane which is obtained from partial hydrolysis of hydrolyzable terminal groups thereon into hydroxyl groups by a well-known method, that is, obtained from hydrolysis of some of hydrolyzable terminal groups X on the fluoropolyether-containing polymer-modified silane having formula (1) into hydroxyl groups.

In the course of synthesis of the fluoropolyether-containing polymer-modified silane according to the invention, formation of by-products is suppressed.

EXAMPLE

Examples of the invention are given below by way of illustration and not by way of limitation.

Synthesis Example 1

A reactor was charged with 150 g of tetrahydrofuran and 300 g of 1,3-bis(trifluoromethyl)benzene, to which 160 ml of 0.7M allylmagnesium bromide was added dropwise. Subsequently, 300 g ($4.8 \times 10^{-2}$ mol) of a compound having the following formula (a) was slowly added dropwise.

(a)

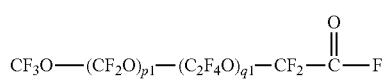

p1:q1 = 47:53, p1 + q1 ≈ 43

The resulting solution was heated at 60*C for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. After washing, the lower layer or fluoro compound layer was recovered again. The residual solvent was distilled off in vacuum, yielding 292 g of a fluoropolyether-containing polymer having the following formula (A).

(A)

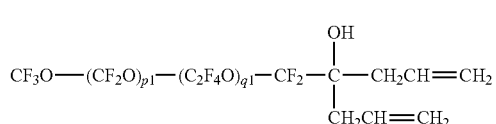

p1:q1 = 47:53, p1 + q1 ≈ 43

Example 1

A reactor was charged with 300 g of 1,3-bis(trifluoromethyl)benzene, 41.9 g (0.41 mol) of acetic anhydride, 41.5 g ($4.1 \times 10^{-1}$ mol) of triethylamine, and 0.49 g ($4.1 \times 10^{-3}$ mol) of N,N-dimethyl-4-aminopyridine, to which 300 g ($8.1 \times 10^{-2}$ mol) of the compound having the formula (A) shown below was slowly added dropwise.

(A)

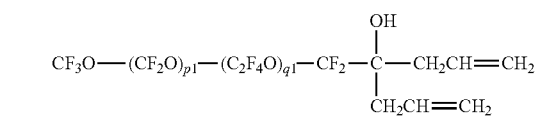

p1:q1 = 47:53, p1 + q1 ≈ 43

The solution was heated at 60° C. for 18 hours. Thereafter, it was cooled to room temperature and water was added dropwise. The lower layer or fluoro compound layer was recovered by separatory operation and washed with methanol. After washing, the lower layer or fluoro compound layer was recovered again. The residual solvent was distilled off in vacuum, yielding 292 g of a fluoropolyether-containing polymer having the following formula (B).

(B)

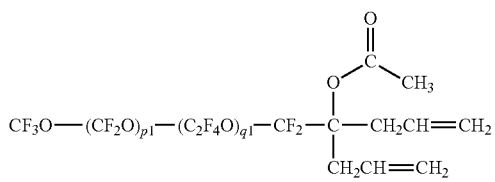

p1:q1 = 47:53, p1 + q1 ≈ 43

$^1$H-NMR

δ 1.8-1.9 (—OCOC$\underline{H}_3$) 3H

δ 2.7-2.8, 2.9-3.0 (—C$\underline{H}_2$CH=CH$_2$) 4H

δ 5.0-5.1 (—CH$_2$CH=C$\underline{H}_2$) 4H

δ 5.7-5.8 (—CH$_2$C$\underline{H}$=CH$_2$) 2H

In a reactor, 200 g ($5.4 \times 10^{-2}$ mol) of the compound having the formula (B) shown below, 200 g of 1,3-bis(trifluoromethyl)benzene, 19.8 g ($1.6 \times 10^{-1}$ mol) of trimethoxysilane and 0.20 g of a toluene solution of chloroplatinic acid/vinylsiloxane complex (containing $5.3 \times 10^{-6}$ mol of Pt) were mixed.

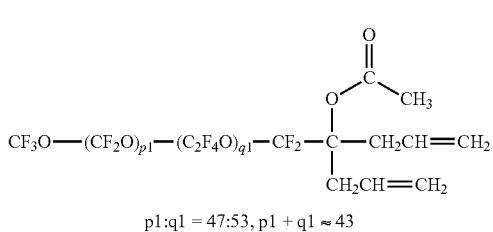

(B)

p1:q1 = 47:53, p1 + q1 ≈ 43

The solution was aged at 80° C. for 24 hours. Thereafter, the solvent and unreacted reactants were distilled off in vacuum, obtaining 205 g of a liquid product.

On NMR analysis, the product was identified to have a structure of the following formula (C).

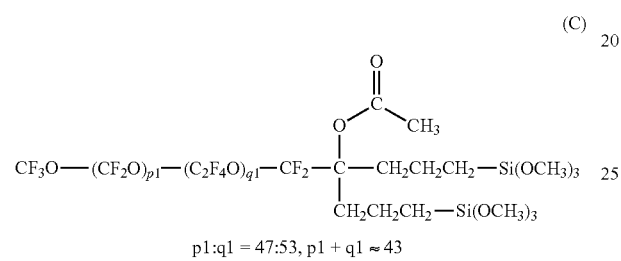

(C)

p1:q1 = 47:53, p1 + q1 ≈ 43

$^1$H-NMR
δ 0.4-0.5 (—CH$_2$CH$_2$C$\underline{H}_2$—Si) 4H
δ 1.3-1.5 (—CH$_2$C$\underline{H}_2$CH$_2$—Si) 4H
δ 1.8-1.9 (—OCOC$\underline{H}_3$) 3H
δ 2.0-2.2 (—C$\underline{H}_2$CH$_2$CH$_2$—Si) 4H
δ 3.4-3.5 (—Si(OC$\underline{H}_3$)$_3$) 18H Synthesis Example 2

A reactor was charged with 150 g of tetrahydrofuran and 300 g of 1,3-bis(trifluoromethyl)benzene, to which 250 ml (2.5×10$^{-1}$ mol) of 1M allylmagnesium chloride was added dropwise. Subsequently, 300 g (8.4×10$^{-2}$ mol) of a compound having the following formula (b) was slowly added dropwise.

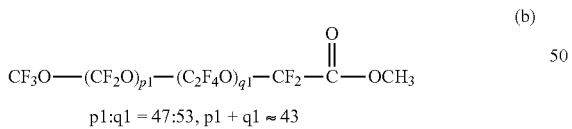

(b)

p1:q1 = 47:53, p1 + q1 ≈ 43

The resulting solution was heated at 60° C. for 4 hours. It was cooled to room temperature, after which 43 g (4.2×10$^{-1}$ mol) of acetic anhydride and 0.51 g (4.2×10$^{-3}$ mol) of N,N-dimethyl-4-aminopyridine were added. The solution was further heated at 60° C. for 4 hours. After heating, it was cooled to room temperature and added dropwise to 1.2M hydrochloric acid aqueous solution to quench the reaction. The lower layer or fluoro compound layer was recovered by separatory operation and washed with acetone. After washing, the lower layer or fluoro compound layer was recovered again. The residual solvent was distilled off in vacuum, yielding 290 g of a fluoropolyether-containing polymer having the following formula (B).

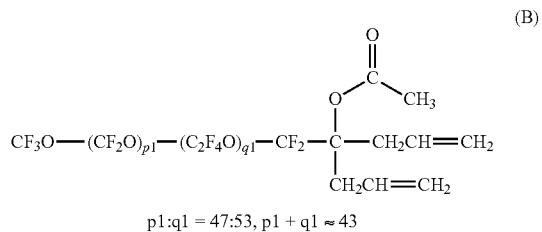

(B)

p1:q1 = 47:53, p1 + q1 ≈ 43

Example 2

A reactor was charged with 75 g of tetrahydrofuran and 2.7 g (6.8×10$^{-2}$ mol) of 60 wt % sodium hydride, to which 50 g (1.4×10$^{-2}$ mol) of the compound having the formula (A) shown below was slowly added dropwise.

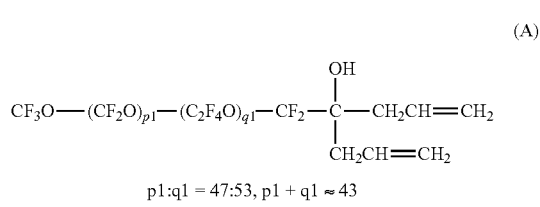

(A)

p1:q1 = 47:53, p1 + q1 ≈ 43

The resulting solution was heated at 40° C. for 1 hour. Then 10.5 g (6.8×10$^{-2}$ mol) of p-toluoyl chloride and 8.6×10$^{-2}$ g (7.0×10$^{-4}$ mol) of N,N-dimethyl-4-aminopyridine were added to the solution, which was heated at 60° C. for 18 hours. Thereafter, it was cooled to room temperature and added dropwise to 1.2M hydrochloric acid aqueous solution. The lower layer or fluoro compound layer was recovered by separatory operation and washed with acetone. After washing, the lower layer or fluoro compound layer was recovered again. The residual solvent was distilled off in vacuum, yielding 40 g of a fluoropolyether-containing polymer having the following formula (D).

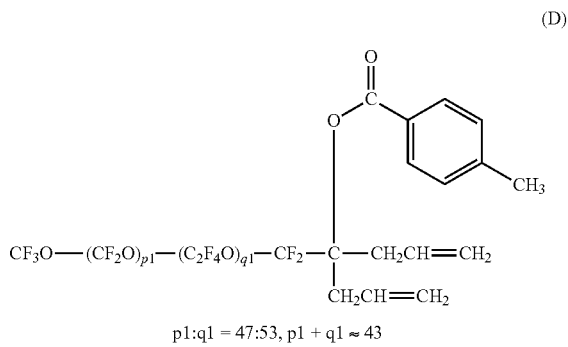

(D)

p1:q1 = 47:53, p1 + q1 ≈ 43

$^1$H-NMR
δ 2.2-2.3 (—OCOC$_6$H$_4$C$\underline{H}_3$) 3H
δ 2.8-2.9, 3.1-3.2 (—C$\underline{H}_2$CH=CH$_2$) 4H
δ 4.9-5.2 (—CH$_2$CH=C$\underline{H}_2$) 4H
δ 5.7-5.9 (—CH$_2$C$\underline{H}$=CH$_2$) 2H
δ 7.0-7.1, 7.8-7.9 (—OCOC$_6$$\underline{H}_4$CH$_3$) 4H In a reactor, 40 g (1.1×10$^{-2}$ mol) of the resulting compound having the formula (D) shown below, 40 g of 1,3-bis(trifluoromethyl)benzene, 4.0 g (3.3×10$^{-2}$ mol) of trimethoxysilane and 4.1×10⁻² g of a toluene solution of chloroplatinic acid/vinylsiloxane complex (containing 1.1×10⁻⁶ mol of Pt) were mixed.

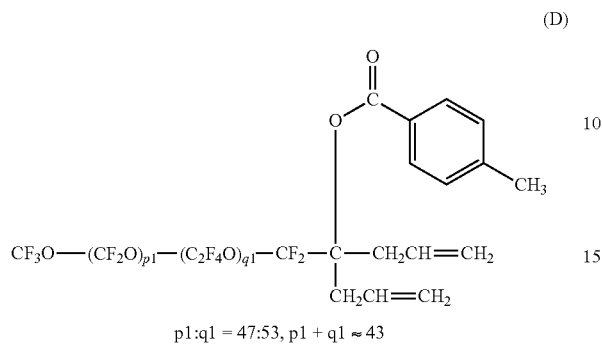

(D)

$CF_3O$—$(CF_2O)_{p1}$—$(C_2F_4O)_{q1}$—$CF_2$—C(—$CH_2CH=CH_2$)(—$CH_2CH=CH_2$)—O—C(=O)—C$_6$H$_4$—CH$_3$ p1:q1 = 47:53, p1 + q1 ≈ 43

The solution was aged at 80° C. for 24 hours. Thereafter, the solvent and unreacted reactants were distilled off in vacuum. Subsequently, the residual low- and high-boiling fractions were removed by means of a molecular distillation still, obtaining 42 g of a liquid product.

On NMR analysis, the product was identified to have a structure of the following formula (E).

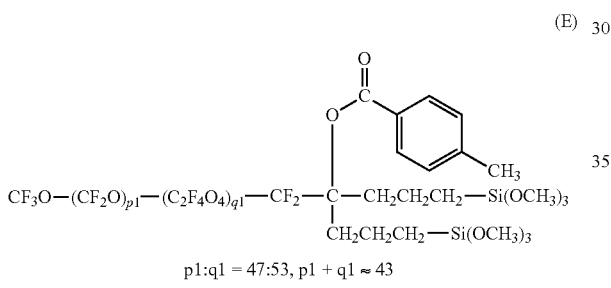

(E)

$CF_3O$—$(CF_2O)_{p1}$—$(C_2F_4O_4)_{q1}$—$CF_2$—C(—$CH_2CH_2CH_2$—Si(OCH$_3$)$_3$)(—$CH_2CH_2CH_2$—Si(OCH$_3$)$_3$)—O—C(=O)—C$_6$H$_4$—CH$_3$ p1:q1 = 47:53, p1 + q1 ≈ 43

¹H-NMR
δ 0.3-0.4 (—CH$_2$CH$_2$C$\underline{H}_2$—Si) 4H
δ 1.2-1.5 (—CH$_2$C$\underline{H}_2$CH$_2$—Si) 4H
δ 2.1-2.3 (—OCOC$_6$H$_4$C$\underline{H}_3$) 3H
δ 2.4-2.5 (—C$\underline{H}_2$CH$_2$CH$_2$—Si) 4H
δ 3.4-3.6 (—Si(OC$\underline{H}_3$)$_3$) 18H
δ 7.0-7.1, 7.8-7.9 (—OCOC$_6$$\underline{H}_4$CH$_3$) 4H Example 3

In a reactor, 100 g of methyl nonafluorobutyl ether, 13.6 g (1.3×10⁻¹ mol) of triethylamine and 100 g (2.7×10⁻² mol) of the compound having the formula (A) shown below were mixed.

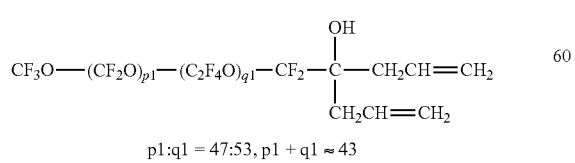

(A)

$CF_3O$—$(CF_2O)_{p1}$—$(C_2F_4O)_{q1}$—$CF_2$—C(OH)(—$CH_2CH=CH_2$)(—$CH_2CH=CH_2$)

p1:q1 = 47:53, p1 + q1 ≈ 43

The solution was cooled to 5° C. and 6.2 g (5.4×10⁻² mol) of methanesulfonyl chloride was slowly added dropwise.

The resulting solution was aged at 25° C. for 20 hours and then added dropwise to 1.2M hydrochloric acid aqueous solution. The lower layer or fluoro compound layer was recovered by separatory operation and washed with acetone and methanol. After washing, the lower layer or fluoro compound layer was recovered again. The residual solvent was distilled off in vacuum, yielding 95 g of a fluoropolyether-containing polymer having the following formula (F).

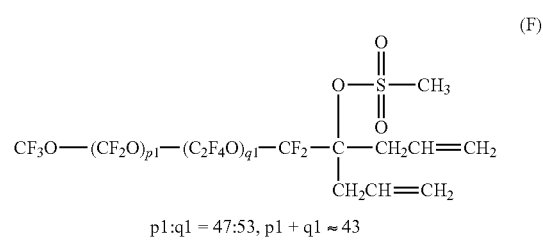

(F)

$CF_3O$—$(CF_2O)_{p1}$—$(C_2F_4O)_{q1}$—$CF_2$—C(—$CH_2CH=CH_2$)(—$CH_2CH=CH_2$)—O—S(=O)$_2$—CH$_3$ p1:q1 = 47:53, p1 + q1 ≈ 43

¹H-NMR
δ 2.7-3.2 (—C$\underline{H}_2$CH=CH$_2$, —OSO$_2$C$\underline{H}_3$) 7H
δ 5.0-5.2 (—CH$_2$CH=C$\underline{H}_2$) 4H
δ 5.7-5.9 (—CH$_2$C$\underline{H}$=CH$_2$) 2H In a reactor, 200 g (5.4×10⁻² mol) of the compound having the formula (F) shown below, 200 g of 1,3-bis(trifluoromethyl)benzene, 19.8 g (1.6×10⁻¹ mol) of trimethoxysilane and 0.20 g of a toluene solution of chloroplatinic acid/vinylsiloxane complex (containing 5.3×10⁻⁴ mol of Pt) were mixed.

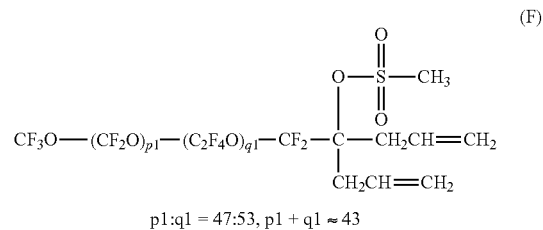

(F)

$CF_3O$—$(CF_2O)_{p1}$—$(C_2F_4O)_{q1}$—$CF_2$—C(—$CH_2CH=CH_2$)(—$CH_2CH=CH_2$)—O—S(=O)$_2$—CH$_3$ p1:q1 = 47:53, p1 + q1 ≈ 43

The solution was aged at 80° C. for 24 hours. Thereafter, the solvent and unreacted reactants were distilled off in vacuum, obtaining 201 g of a liquid product.

On NMR analysis, the product was identified to have a structure of the following formula (G).

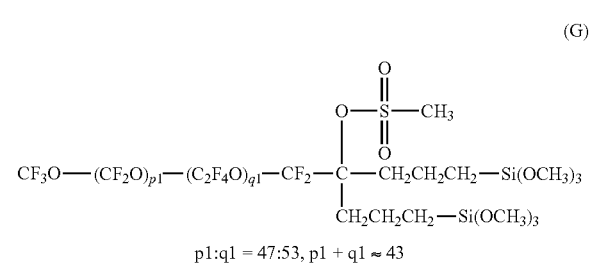

(G)

$CF_3O$—$(CF_2O)_{p1}$—$(C_2F_4O)_{q1}$—$CF_2$—C(—$CH_2CH_2CH_2$—Si(OCH$_3$)$_3$)(—$CH_2CH_2CH_2$—Si(OCH$_3$)$_3$)—O—S(=O)$_2$—CH$_3$ p1:q1 = 47:53, p1 + q1 ≈ 43

¹H-NMR
δ 0.4-0.6 (—CH$_2$CH$_2$C$\underline{H}_2$—Si) 4H
δ 1.2-1.4 (—CH$_2$C$\underline{H}_2$CH$_2$—Si) 4H
δ 2.0-2.3 (—C$\underline{H}_2$CH$_2$CH$_2$—Si) 4H
δ 2.7-3.1 (—OSO$_2$C$\underline{H}_3$) 3H
δ 3.5-3.7 (—Si(OC$\underline{H}_3$)$_3$) 18H

Synthesis Example 3

A reactor was charged with 150 g of tetrahydrofuran and 300 g of 1,3-bis(trifluoromethyl)benzene, to which 320 ml of 0.7M allylmagnesium bromide was added dropwise. Subsequently, 300 g ($9.6 \times 10^{-2}$ mol) of a compound having the following formula (h) was slowly added dropwise.

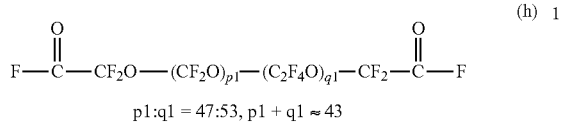

$p1:q1 = 47:53, p1 + q1 \approx 43$

The resulting solution was heated at 60° C. for 4 hours. Thereafter, it was cooled to room temperature and added dropwise to 300 g of 1.2M hydrochloric acid aqueous solution to quench the reaction. The lower layer or fluoro compound layer was recovered by separatory operation and washed with acetone. After washing, the lower layer or fluoro compound layer was recovered again. The residual solvent was distilled off in vacuum, yielding 286 g of a fluoropolyether-containing polymer having the following formula (H).

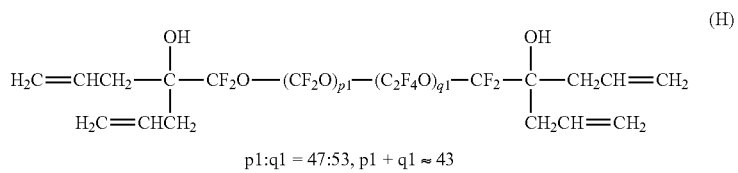

$p1:q1 = 47:53, p1 + q1 \approx 43$

Example 4

A reactor was charged with 100 g of 1,3-bis(trifluoromethyl)benzene, 13.3 g (0.13 mol) of acetic anhydride, and 0.16 g ($1.3 \times 10^{-3}$ mol) of N,N-dimethyl-4-aminopyridine, to which 100 g ($2.6 \times 10^{-2}$ mol) of the compound having the following formula (H) was slowly added dropwise.

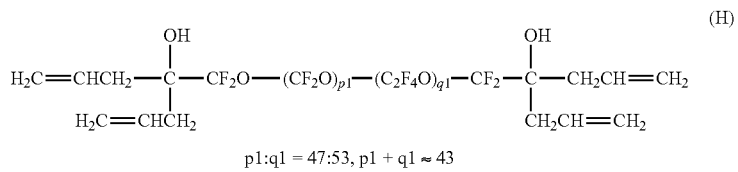

$p1:q1 = 47:53, p1 + q1 \approx 43$

The solution was heated at 60° C. for 18 hours. Thereafter, it was cooled to room temperature and water was added dropwise. The lower layer or fluoro compound layer was recovered by separatory operation and washed with methanol. After washing, the lower layer or fluoro compound layer was recovered again. The residual solvent was distilled off in vacuum, yielding 97 g of a fluoropolyether-containing polymer having the following formula (I).

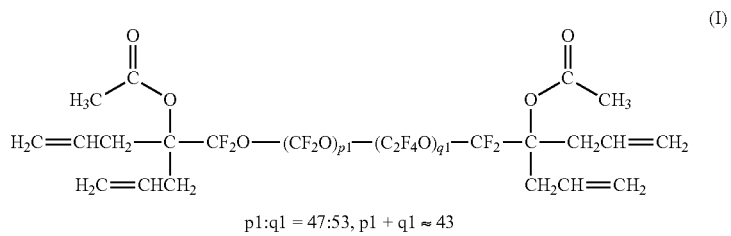

$p1:q1 = 47:53, p1 + q1 \approx 43$

¹H-NMR
δ 1.8-2.0 (—OCOC<u>H</u>₃) 6H
δ 2.7-2.8, 2.9-3.0 (—C<u>H</u>₂CH=CH₂) 8H
δ 5.1-5.2 (—CH₂CH=C<u>H</u>₂) 8H
δ 5.7-5.9 (—CH₂C<u>H</u>=CH₂) 4H

In a reactor, 90 g (2.3×10⁻² mol) of the compound having the formula (I) shown below, 90 g of 1,3-bis(trifluoromethyl)benzene, 8.4 g (6.9×10⁻² mol) of trimethoxysilane and 8.5×10⁻² g of a toluene solution of chloroplatinic acid/vinylsiloxane complex (containing 2.3×10⁻⁶ mol of Pt) were mixed.

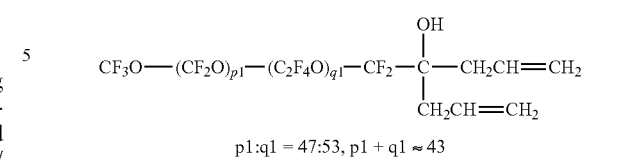

(A)

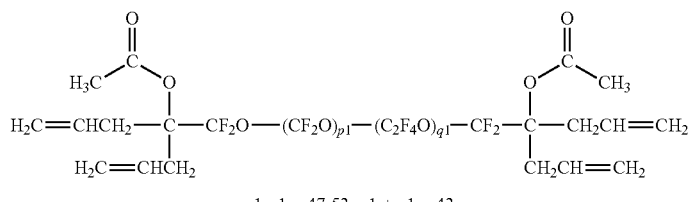

(I)

The solution was aged at 80° C. for 24 hours. Thereafter, the solvent and unreacted reactants were distilled off in vacuum, obtaining 94 g of a liquid product.

On NMR analysis, the product was identified to have a structure of the following formula (J).

The solution was aged at 80° C. for 40 hours. Thereafter, the solvent and unreacted reactants were distilled off in vacuum, obtaining 203 g of a liquid product.

On NMR analysis, the product was identified to have a structure of the following formula (K).

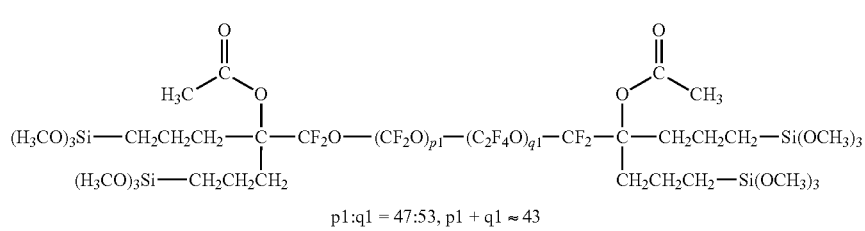

(J)

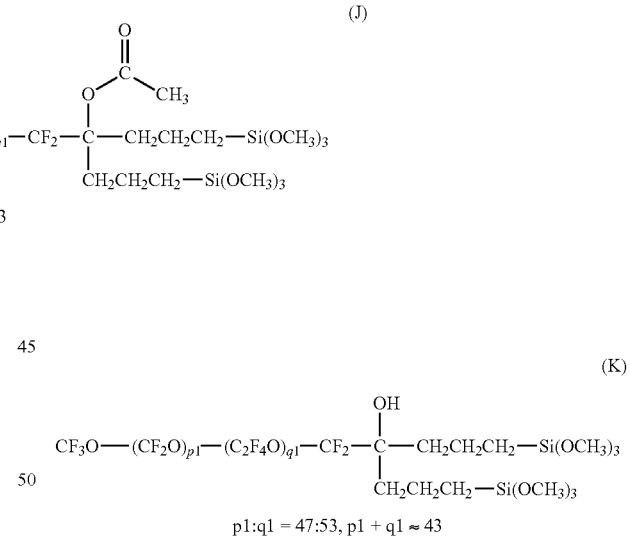

(K)

¹H-NMR
δ 0.4-0.6 (—CH₂CH₂C<u>H</u>₂—Si) 8H
δ 1.3-1.6 (—CH₂C<u>H</u>₂CH₂—Si) 8H
δ 1.7-1.9 (—OCOC<u>H</u>₃) 6H
δ 2.0-2.3 (—C<u>H</u>₂CH₂CH₂—Si) 8H
δ 3.3-3.5 (—Si(OC<u>H</u>₃)₃) 36H

Comparative Example 1

In a reactor, 200 g (2.6×10⁻² mol) of the compound having the formula (A) shown below, 200 g of 1,3-bis(trifluoromethyl)benzene, 12.7 g (1.1×10⁻¹ mol) of trimethoxysilane and 6.0×10⁻¹ g of a toluene solution of chloroplatinic acid/vinylsiloxane complex (containing 1.6×10⁻⁵ mol of Pt) were mixed.

¹H-NMR
δ 0.2-2.2 (—C<u>H</u>₂C<u>H</u>₂C<u>H</u>₂—) 12H
δ 3.0-3.5 (—Si(OC<u>H</u>₃)₃) 18H

From the ¹H-NMR analysis of the fluoropolyether-containing polymer-modified silanes obtained in Examples 1 to 4 and the polymer of Comparative Example 1, the content of by-product was determined, with the results shown in Table 1. The polymer of Comparative Example 1 contained 5 wt % of a by-product owing to the hydroxyl group whereas the fluoropolyether-containing polymer-modified silanes of Examples 1 to 4 contained no by-products because the hydroxyl group was protected with an acyl group. The by-product in Comparative Example 1 is presumed to be a polymer formed by addition of trimethoxysilane to the hydroxyl group.

TABLE 1

By-product content (%) after polymer synthesis

| | Target compound (wt %) | By-product (wt %) |
|---|---|---|
| Example 1 | 100 | 0 |
| Example 2 | 100 | 0 |
| Example 3 | 100 | 0 |
| Example 4 | 100 | 0 |
| Comparative Example 1 | 95 | 5 |

Japanese Patent Application No. 2015-112822 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A fluoropolyether-containing polymer-modified silane having the general formula (1):

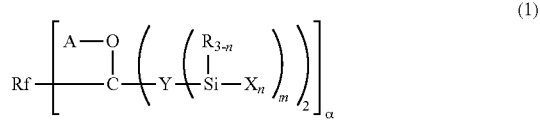

wherein Rf is a monovalent fluorooxyalkyl or divalent fluorooxyalkylene-containing polymer residue, A is a group having a structure of formula:

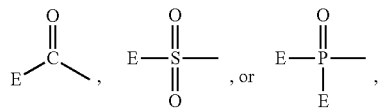

wherein E is a monovalent organic group, Y is a divalent to hexavalent hydrocarbon group which may contain a siloxane bond or silylene group, R is independently a $C_1$-$C_4$ alkyl group or phenyl group, X is independently a hydroxyl group or hydrolyzable group, n is an integer of 1 to 3, m is an integer of 1 to 5, and α is 1 or 2.

2. The silane of claim 1 wherein α is 1, and Rf is a group having the general formula (2):

$$F-(CF_2O)_p-(C_2F_4O)_q-(C_3F_6O)_r-(C_4F_8O)_s-(C_dF_{2d})- \quad (2)$$

wherein p, q, r and s are each independently an integer of 0 to 200, the sum p+q+r+s is 3 to 200, d is an integer of 1 to 3, each repeating unit may be linear or branched, and individual repeating units may be randomly arranged.

3. The silane of claim 1 wherein α is 2, and Rf is a group having the general formula (3):

$$-(F_{2d}C_d)-O-(CF_2O)_p-(C_2F_4O)_q-(C_3F_6O)_r-(C_4F_8O)_s-(C_dF_{2d})- \quad (3)$$

wherein p, q, r and s are each independently an integer of 0 to 200, the sum p+q+r+s is 3 to 200, d is an integer of 1 to 3, each repeating unit may be linear or branched, and individual repeating units may be randomly arranged.

4. The silane of claim 1 wherein Y is selected from the group consisting of a $C_3$-$C_{10}$ alkylene group, an alkylene group containing $C_6$-$C_8$ arylene, a divalent group having alkylene groups bonded via a silalkylene or silarylene structure, and a divalent to tetravalent group having $C_2$-$C_{10}$ alkylene groups bonded to a divalent to tetravalent, linear organopolysiloxane residue of 2 to 10 silicon atoms or branched or cyclic organopolysiloxane residue of 3 to 10 silicon atoms.

5. The silane of claim 1 wherein X is selected from the group consisting of hydroxyl, $C_1$-$C_{10}$ alkoxy group, $C_2$-$C_{10}$ alkoxyalkoxy group, $C_1$-$C_{10}$ acyloxy group, $C_2$-$C_{10}$ alkenyloxy group, and halogen.

6. The silane of claim 1 wherein E is a substituted or unsubstituted monovalent hydrocarbon group of 1 to 10 carbon atoms, alkoxy group of 1 to 6 carbon atoms, or phenoxy group.

7. The silane of claim 1 wherein the polymer-modified silane having formula (1) is selected from compounds having the following formulae:

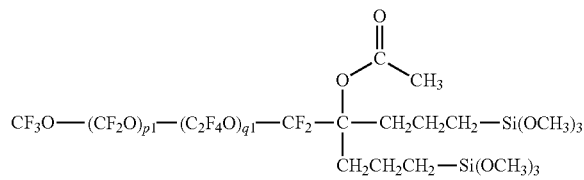

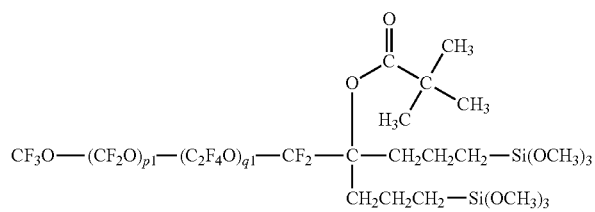

-continued
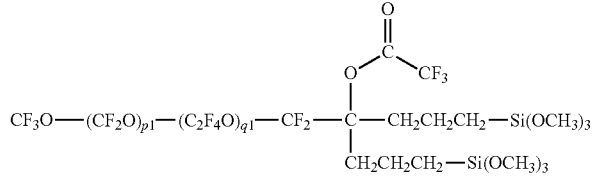
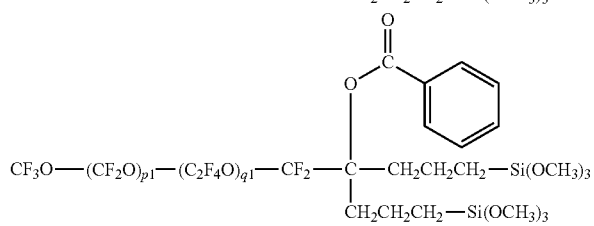
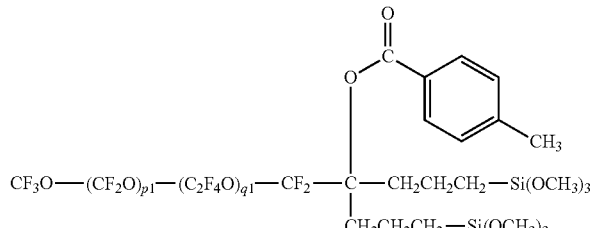
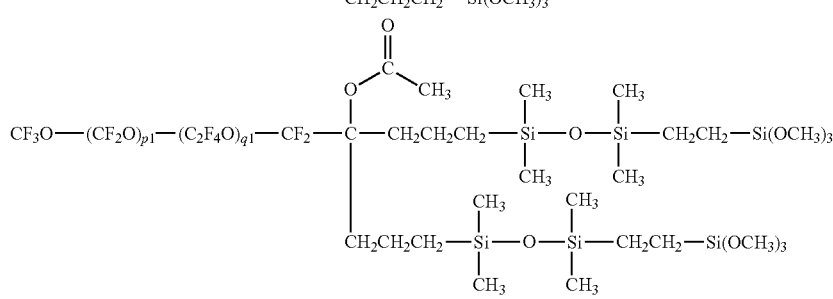
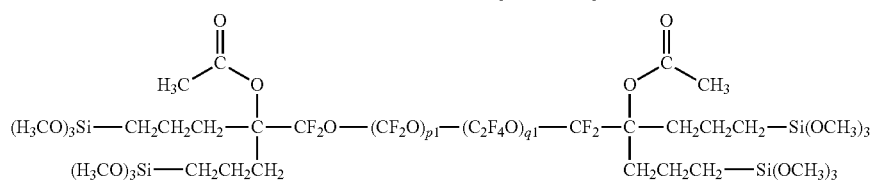
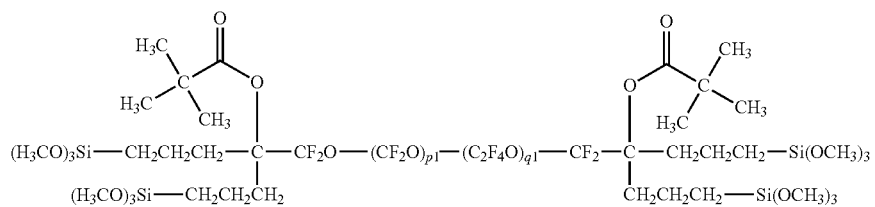
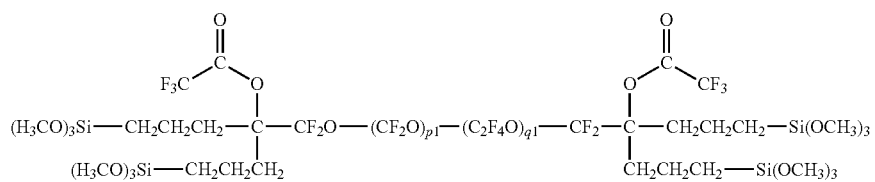
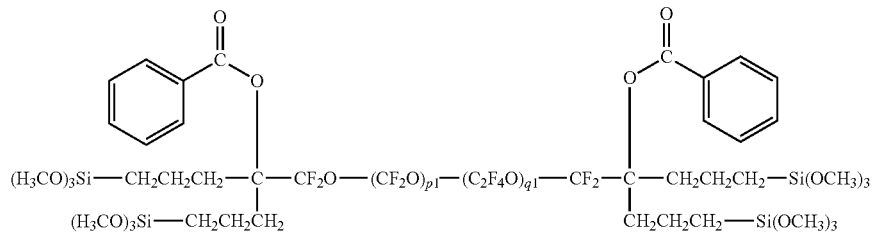

-continued
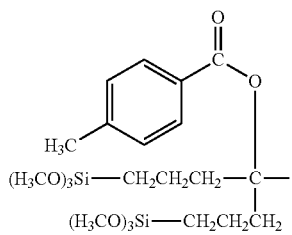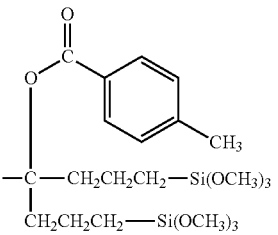
wherein p1 is an integer of 5 to 100, q1 is an integer of 5 to 100, and p1+q1 is an integer of 10 to 105.
8. The silane of claim 1, wherein A is a group having the structure of formula
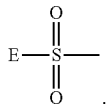
9. The silane of claim 1, wherein A is a group having the structure of formula
10. The silane of claim 1, wherein A is a group having the structure of formula
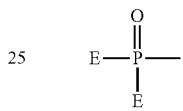
* * * * *